(12) United States Patent
Kitahara et al.

(10) Patent No.: US 12,371,877 B2
(45) Date of Patent: Jul. 29, 2025

(54) CONSTRUCTION EQUIPMENT

(71) Applicant: Yanmar Holdings Co., Ltd., Osaka (JP)

(72) Inventors: Satoshi Kitahara, Fukuoka (JP); Jun Terashima, Fukuoka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 0 days.

(21) Appl. No.: 18/036,892

(22) PCT Filed: Nov. 30, 2021

(86) PCT No.: PCT/JP2021/043731
§ 371 (c)(1),
(2) Date: May 15, 2023

(87) PCT Pub. No.: WO2022/130956
PCT Pub. Date: Jun. 23, 2022

(65) Prior Publication Data
US 2023/0417014 A1    Dec. 28, 2023

(30) Foreign Application Priority Data

Dec. 18, 2020   (JP) ................................. 2020-210452

(51) Int. Cl.
*E02F 9/08* (2006.01)
*B60K 11/06* (2006.01)
(Continued)

(52) U.S. Cl.
CPC ............ *E02F 9/0866* (2013.01); *B60K 11/06* (2013.01); *B60L 9/00* (2013.01); *B60L 50/60* (2019.02);
(Continued)

(58) Field of Classification Search
CPC .................. E02F 9/0866; E02F 9/0858; B60Y 2200/412; B60K 1/00; B60L 2200/40
See application file for complete search history.

(56) References Cited

U.S. PATENT DOCUMENTS

2013/0071212 A1   3/2013   Yunoue et al.
2015/0368874 A1   12/2015  Weaver et al.
(Continued)

FOREIGN PATENT DOCUMENTS

JP   2004137816 A   5/2004
JP   2007032477 A   2/2007
(Continued)

OTHER PUBLICATIONS

Nishikawa et al., Vehicle, Feb. 8, 2007, JPO, JP 2007/32477 A, Machine Translation of Description (Year: 2007).*

*Primary Examiner* — James A English
(74) *Attorney, Agent, or Firm* — Chris Mizumoto

(57) ABSTRACT

The present invention makes it possible to, in a configuration provided with electrical components such as an inverter device for controlling an electric motor, obtain a high degree of freedom with regard to the layout of the electrical components and efficiently place the electrical components in a limited space. An excavator comprises: an electric motor; a hydraulic fluid tank in which hydraulic fluid is stored; a hydraulic pump that is driven by the electric motor and supplies the hydraulic fluid within the hydraulic fluid tank to an actuator; and an inverter device that, with respect to the hydraulic fluid tank, is provided at a position away from a left-side surface part of the hydraulic fluid tank.

8 Claims, 17 Drawing Sheets

(51) Int. Cl.
  *B60L 9/00*           (2019.01)
  *B60L 50/60*        (2019.01)
  *E02F 9/16*           (2006.01)
  *E02F 9/22*           (2006.01)

(52) U.S. Cl.
  CPC .............. *E02F 9/0883* (2013.01); *E02F 9/16* (2013.01); *B60L 2200/40* (2013.01); *E02F 9/2225* (2013.01)

(56) References Cited

U.S. PATENT DOCUMENTS

| | | | |
|---|---|---|---|
| 2017/0067227 A1* | 3/2017 | Ota | B60L 1/02 |
| 2020/0190774 A1* | 6/2020 | Nishigori | E02F 9/16 |
| 2023/0417015 A1* | 12/2023 | Kitahara | B60K 1/04 |

FOREIGN PATENT DOCUMENTS

| | | |
|---|---|---|
| JP | 2016030924 A | 3/2016 |
| JP | 2018071850 A | 5/2018 |
| JP | 2019116859 A | 7/2019 |
| WO | 2011102042 A1 | 8/2011 |

\* cited by examiner

CONSTRUCTION EQUIPMENT

CROSS-REFERENCE

This application is a US National Stage Application under 35 U.S.C. § 371 of International Application No. PCT/JP2021/043731 filed Nov. 30, 2021, which claims foreign priority of JP2020-210452 filed Dec. 18, 2020 and the disclosures of which are hereby incorporated by reference in their entirety.

TECHNICAL FIELD

The present invention relates to a construction machine provided with an electric device, such as an inverter device that controls an electric motor, for example.

BACKGROUND ART

Conventionally, in construction machines such as excavators, for example, there is one that is of electrically driven type which is provided with an electric motor as a drive source. The electrically-driven construction machine includes an electric device, such as an inverter device, that controls the electric motor.

As the electrically-driven construction machine, there is an excavator which is provided with a lower run body and an upper swing body so installed as to be swingable relative to the lower run body, and which installs an electric motor to the upper swing body, for example. In this type of construction machine, a compact configuration is required from the viewpoint of reducing a swing radius of the upper swing body, etc.; thus, the layout of the electric device such as the inverter device is important.

Regarding the layout of the electric device in the electrically-driven construction machine, there is, for example, a technology disclosed in Patent Literature 1. Patent Literature 1 discloses the technology related to placing of a controller and a storage in a hybrid excavator provided with a generator motor driven by an engine as a drive source, the controller including an inverter, and the storage.

Specifically, in the hybrid excavator of Patent Literature 1, a cabin is placed on the left side of the swing frame included in the upper swing body, and respective tanks of a fuel and a hydraulic oil are placed on the right side of the swing frame. Then, the controller and the storage are cased in a staircase-shaped component case, and the component case is placed in front of the tank.

CITATION LIST

Patent Literature

Patent Literature 1: Japanese Unexamined Patent Application Publication No. 2012-172332

DISCLOSURE OF INVENTION

Problems to be Solved by the Invention

In the configuration disclosed in Patent Literature 1, the component case in which the electric device such as controller is cased is formed in the form of a staircase, causing a greater restriction on the position of placing the electric device. Further, in the configuration where the component case casing the electric device is placed in front of the tank, the position on the swing frame is easily restricted.

For employing the configuration, which is disclosed in Patent Literature 1, in a relatively small excavator, in particular, it is difficult to secure a space for placing the electric device on the swing frame. This tends to make it difficult to properly place the electric device on the swing frame.

The present invention has been made in view of the above issue; it is therefore an object of the present invention to provide, in a configuration provided with an electric device such as an inverter device that controls an electric motor, a construction machine that can obtain a high degree of freedom regarding the layout of the electric device, and that can efficiently place the electric device in a limited space.

Means for Solving the Problems

A construction machine according to the present invention includes: a prime mover; a hydraulic oil tank that tanks a hydraulic oil; a hydraulic pump driven by the prime mover thereby to supply the hydraulic oil in the hydraulic oil tank to an actuator; and an electric device provided, to the hydraulic oil tank, is provided in a position spaced apart from a side face of the hydraulic oil tank.

In the construction machine according to another mode of the present invention, the prime mover is an electric motor driven by electric power supplied from outside, and the electric device is a device that controls the electric power supplied to the electric motor.

In the construction machine according to another mode of the present invention, the electric device is provided in a state of being supported on a pedestal that supports the hydraulic oil tank.

The construction machine according to another mode of the present invention, includes: a fan for taking air in a housing space of the hydraulic oil tank, wherein the electric device is provided between an open part that is formed in a site which is of an exterior cover part forming the housing space and which is in front of and below the hydraulic oil tank, and that communicates the housing space to outside, and the fan.

In the construction machine according to another mode of the present invention, a drive part having a drive seat placed on a seat mount provided behind a floor part, wherein the fan is placed in an edge part on one of right and left sides of a machine body, the hydraulic oil tank is placed in front of the fan, the prime mover is placed in a back part of the machine body, and a cover which covers the electric device is provided between the floor part and a cover part which covers the hydraulic oil tank.

In the construction machine according to another mode of the present invention, the pedestal forms a space part on a back side of a support face part that supports the hydraulic oil tank, and includes a second electric device provided in a state of being supported on the back side of the support face part.

In the construction machine according to another mode of the present invention, the second electric device is provided in a position spaced apart from a back face of the support face part.

The construction machine according to another mode of the present invention, includes: a third electric device placed below the second electric device.

Effect of the Invention

The present invention, in a configuration provided with an electric device such as an inverter device that controls an electric motor, can obtain a high degree of freedom regarding the layout of the electric device, and can efficiently place the electric device in a limited space.

DESCRIPTION OF EMBODIMENTS

The present invention seeks to devise, in a configuration provided with an electric device such as an inverter device that controls an electric motor, a placement configuration of the electric device thereby to improve the degree of freedom of layout of the electric device and to efficiently place the electric device in a limited space. A description will hereinafter be made on an embodiment of the present invention with reference to the drawings.

In the embodiment of the present invention, a description will be made on an excavator (shovel) which is a swing work vehicle, as an example of construction machine according to the present invention. However, the construction machine according to the present invention is not limited to the excavator, and is widely applicable to other types of the construction machine such as a bulldozer, a crane work machine, a compact track loader, a skid-steer loader, and a wheel loader.

Figure 1:
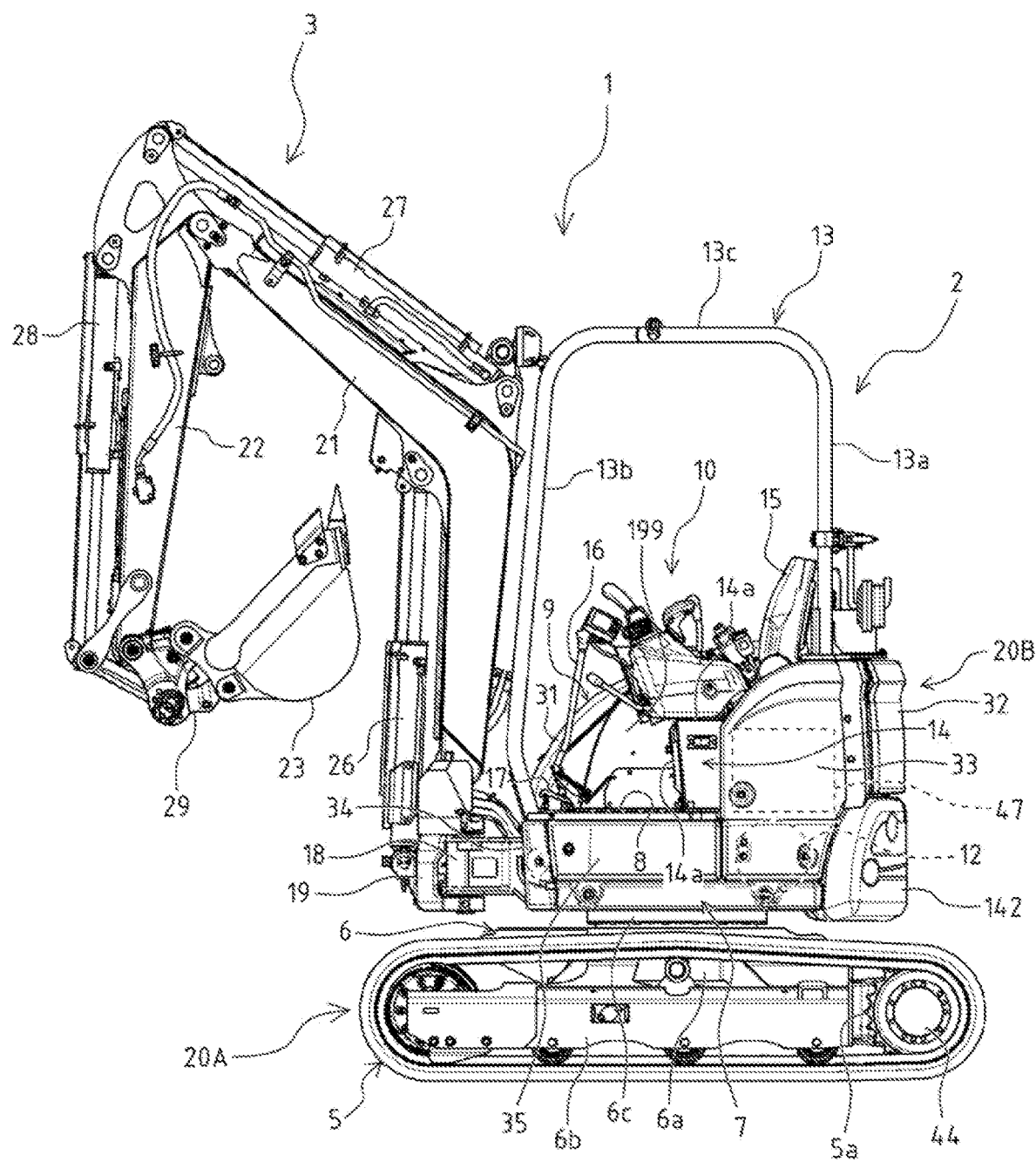
FIG. 1 is a left side view of an excavator according to one embodiment of the present invention.
Figure 2:
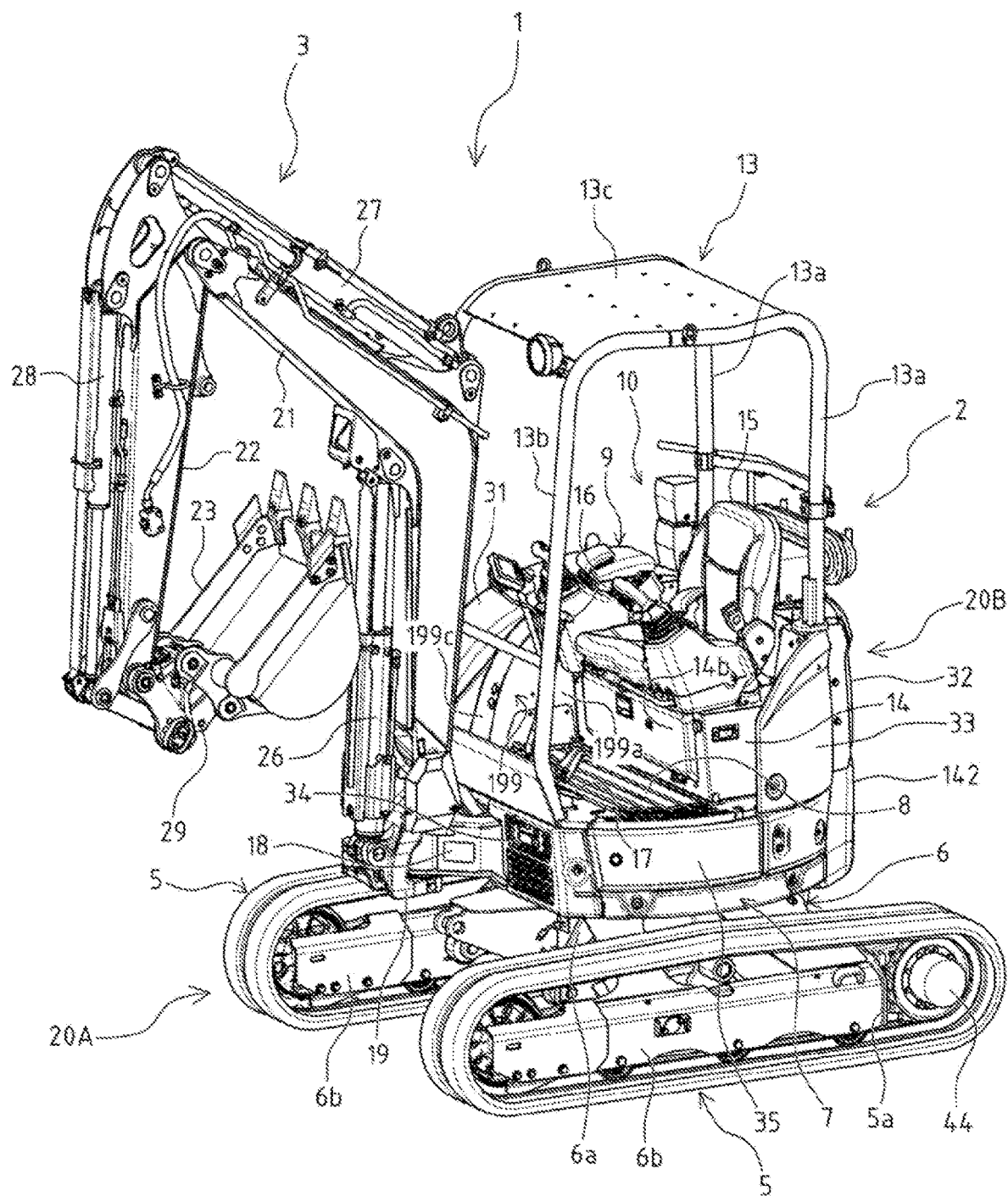
FIG. 2 is a perspective view from the left front of the excavator according to the one embodiment of the present invention.

A description will be made on an overall configuration of the excavator 1 according to the present embodiment with reference to FIGS. 1 and 2. As shown in FIGS. 1 and 2, the excavator 1 includes a run device 2 as a self-propelled run body, and an excavation device 3 as a work part mounted to the run device 2.

The run device 2 is a part constituting a main machine of the excavator 1, and has a pair of right and left crawler-type run parts 5, 5, a truck frame 6 as a base to support the right and left run parts 5, 5, and a swing frame 7 provided on the truck frame 6.

The run part 5 has a configuration in which a crawler is wound around a plurality of rotary bodies such as sprockets supported to a given frame part included in the truck frame 6. The run part 5, in a back end part thereof, has a drive sprocket 5a which is a drive wheel. The truck frame 6 has a center frame part 6a positioned in the center part between the right and left run parts 5, 5, and side frame parts 6b provided on both the right and left sides of the center frame part 6a.

The swing frame 7 is configured to be a substantially circular shape in plan view, and is so provided as to be swingable, relative to the truck frame 6, in any of right and left directions around an up/down axial line by a swing support part 6c provided on the upper side of the truck frame 6. The swing frame 7 is so configured as to be swingable within the right/left width of the right and left run parts 5, 5, i.e., within the width between the left outer edge of the left run part 5 and the right edge of the right run part 5. This allows for a small swing work by the excavator 1.

On the swing frame 7, there is provided a drive part 10 having a flat floor part 8. The floor part 8 is provided on the left part of the first half part on the swing frame 7. A tank part 9 is provided on the right side of the drive part 10. In the drive part 10, the left side of the floor part 8 is an entry/exit of an operator. Behind the swing frame 7, there is provided, as a drive source, an electric motor 12 which is a prime mover.

The drive part 10 is for driving and operating the run device 2 and the excavation device 3. On the swing frame 7, there is provided a canopy 13 for the drive part 10. The canopy 13 has a pair of right and left back pillar parts 13a, 13a standing above the prime mover part, a pair of right and left front pillar parts 13b, 13b standing at the front end part of the floor part 8, and a canopy roof unit 13c provided between the front and back pillar parts. The canopy roof unit 13c covers the drive part 10 from above.

In the drive part 10; a drive seat support base 14 as a seat mount is provided on the back side of the floor part 8, and a drive seat 15 is provided on the drive seat support base 14. In front of the drive seat 15, there is provided a pair of right and left run levers 16 extending upward from the floor part 8. On both right and left sides of the run lever 16 on the floor part 8, there is placed a plurality of operation pedals 17 for work. In the drive part 10; the drive seat 15 is surrounded by work operation levers for operating the work part such as the excavation device 3, and an operation panel part having various operation parts such as a switch.

The excavator 1 has a lower run body 20A which includes the truck frame 6 and the run parts 5, 5 supported to both the right and left sides of the truck frame 6, and an upper swing body 20B as a machine body so installed as to be swingable relative to the lower run body 20A. The upper swing body 20B includes the swing frame 7 as a frame included in the machine body, and the drive part 10 provided on the swing frame 7.

Figure 4:
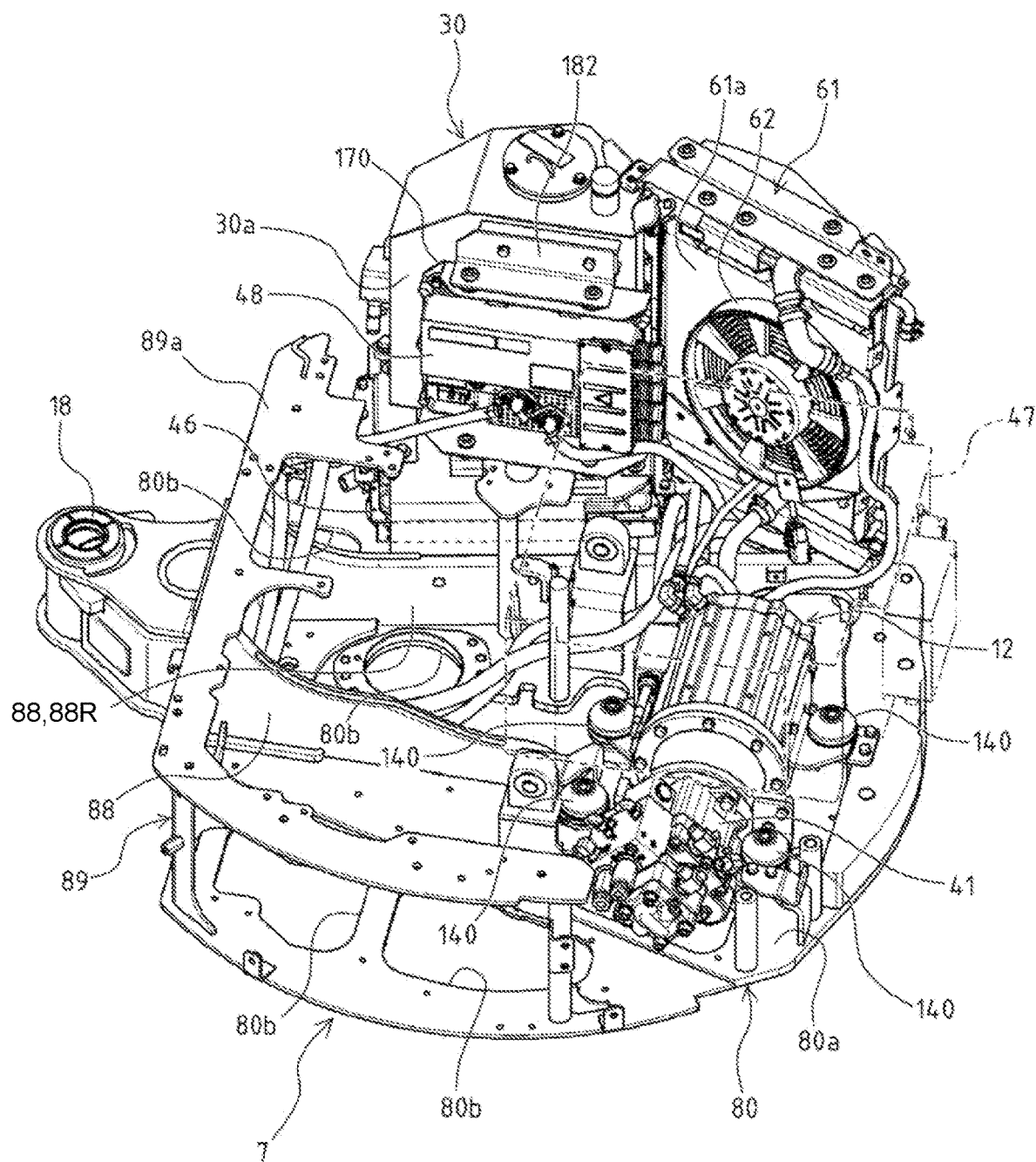
FIG. 4 is a perspective view of one example of a placement mode of the device configuration provided for the excavator according to the one embodiment of the present invention.

Further, the tank part 9 provided on the right side of the drive part 10 is provided with a hydraulic oil tank 30 that tanks a hydraulic oil (see FIG. 4). The hydraulic oil tank 30 is provided in the front right part of the swing frame 7. The hydraulic oil in the hydraulic oil tank 30 is supplied to hydraulic cylinders and the like provided for the excavator 1, such as hydraulic cylinders and the like included in the excavation device 3.

The hydraulic oil tank 30 is covered with a right cover part 31. The right cover part 31 is a cover part that covers the hydraulic oil tank 30 and a radiator 61 which is provided on the back side thereof, and forms the right side of an exterior cover part that forms an exterior of the upper swing body 20B. The exterior cover part of the upper swing body 20B includes a back cover part 32 forming the back part thereof, a left cover part 33 forming the left portion of the exterior cover part, a front lower cover part 34 covering the lower front part of the upper swing body 20B, and a left front cover part 35 provided below the left end of the floor part 8. The back cover part 32 has its one of right and left sides rotatably supported by a hinge part. The left cover part 33 covers the left side of the drive seat support base 14. A counter weight 142 is provided below the back cover part 32.

The excavation device 3 is a front work device that is provided on a front side of the run device 2. In the right/left center part at the front end of the swing frame 7, a support bracket 18 to support the excavation device 3 is so provided as to protrude forward. A boom support bracket 19 serves as a base end part of the excavation device 3, with the up/down direction as a rotary axial direction, is rotatably supported to the support bracket 18. The excavation device 3 is so provided as to swing to the left and right relative to the swing frame 7 by a swing-dedicated hydraulic cylinder 20 (see FIG. 9) provided between the boom support bracket 19 and the swing frame 7 on the right side of the boom support bracket 19.

The swing-dedicated hydraulic cylinder 20 is provided between the boom support bracket 19 and the swing frame 7. The swing-dedicated hydraulic cylinder 20 has its back bottom side pivotally supported to on the base plate part 80 of the swing frame 7 and its front rod side pivotally supported to the boom support bracket 19.

The excavation device 3 has a boom 21 that has a shape bent in a boomerang shape in side view and that is included in a base part side of the excavation device 3, an arm 22 that is connected to a tip end side of the boom 21, and a bucket 23 that is mounted to a tip end part of the arm 22. The excavation device 3 has a boom cylinder 26 that causes the boom 21 to be rotationally operated, an arm cylinder 27 that causes the arm 22 to be rotationally operated, and a work tool cylinder 28 that causes the bucket 23 to be rotationally operated. These cylinders are each a hydraulic cylinder.

The bucket 23, as a work attachment, is detachably connected via an attachment detachable device 29 to the tip part of the arm 22. In the excavation device 3, another device such as a grapple or a breaker is mounted instead of the bucket 23, depending on the nature of the work.

With the excavator 1 that has the configuration as above, the operator, who is seated on the drive seat 15, by properly operating the run lever 16, the work operation lever or the like, performs a desired operation or work. Specifically, by the operating of the run lever 16, for example, the run device 2 makes the front/back linear run or the right/left swing run. Further, operating of the work operation lever performs the excavating work, etc. by the excavation device 3.

Figure 3:
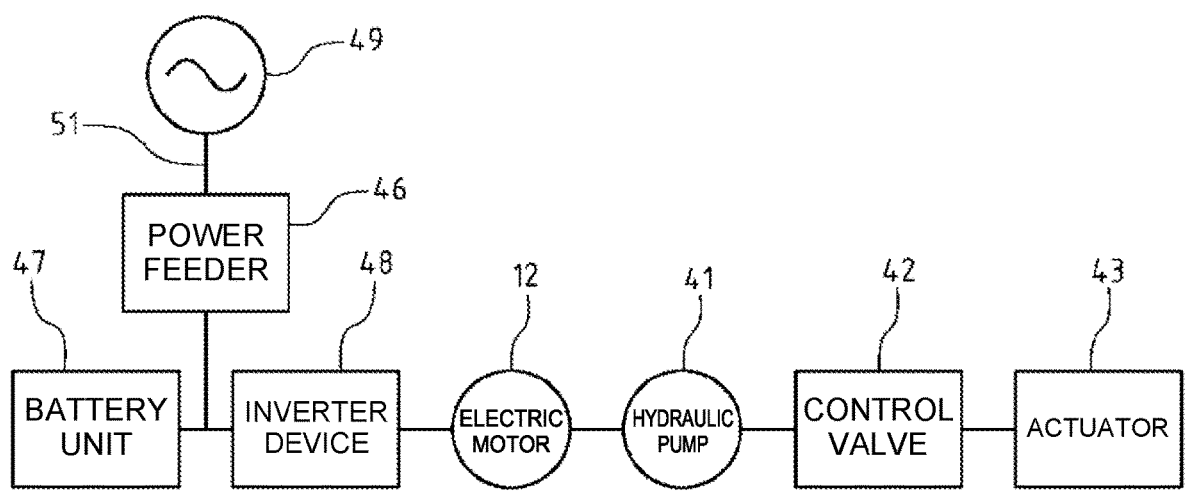
FIG. 3 is a block diagram showing a device configuration provided for the excavator according to the one embodiment of the present invention.

The excavator 1 according to the present embodiment is an electrically-driven construction machine provided with the electric motor 12 as the drive source. As shown in FIG. 3, the electric motor 12 is a pump drive motor that drives a hydraulic pump 41. The electric motor 12 is a three-phase AC motor, for example, and is driven by a supply of AC power. The hydraulic pump 41 is driven by the electric motor 12, thereby to supply, via a control valve 42 to an actuator 43, the hydraulic oil in the hydraulic oil tank 30.

The actuator 43 is a generic term of various hydraulic actuators provided for the excavator 1. The actuators 43 are, for example, the boom cylinder 26, the arm cylinder 27, the work tool cylinder 28, the swing-dedicated hydraulic cylinder 20, a turn-dedicated hydraulic cylinder, and the like.

The control valve 42 controls the flow of pressure oil to each hydraulic actuator as the actuator 43. The control valve 42 includes a plurality of direction-switch valves which correspond to respective hydraulic actuators, and, by the operation control, etc. of the direction-switch valves, controls the rate and destination of the pressure oil supplied, by the driving of the hydraulic pump 41, from inside the hydraulic oil tank 30. Controlling the supply of the pressure oil to the actuator 43 performs the operation of the excavation device 3 and the swing operation of the upper swing body 20B, etc.

As shown in FIG. 4, the electric motor 12, in the back lower part of the swing frame 7, is placed horizontally, with the axial direction of the drive shaft in the right/left direction. The hydraulic pump 41 is provided on the left side of the electric motor 12. The hydraulic pump 41 has its rotary shaft connected via a coupling to the drive shaft of the electric motor 12, and driven following the rotation of the drive shaft of the electric motor 12, thereby to send out the hydraulic oil. The control valve 42 is provided in a given position on the swing frame 7 (e.g., at the left side of the front part of the swing frame 7) in the upper swing body 20B.

Further, the excavator 1 has a pair of right and left run-dedicated hydraulic motors 44, 44 (see FIGS. 1 and 2). The run-dedicated hydraulic motor 44 is driven by receiving a supply of the pressure oil from the control valve 42, and, in each run part 5, is so provided as to rotate and drive the drive sprocket 5a while being mounted to a given site such as the side frame part 6b of the truck frame 6. The right and left run-dedicated hydraulic motors 44, 44 each drive the run part 5, thereby to cause the run device 2 to make the linear front/back run and the right/left swing run.

As shown in FIG. 3, as the configuration electrically connected directly or indirectly to the electric motor 12, the excavator 1 has the power feeder 46 to supply the electric power from the outside to the electric motor 12, the battery unit 47 as a battery to supply the electric power to the electric motor 12, and the inverter device 48 to control the electric motor 12.

As shown in FIG. 3, the power feeder 46, by a power supply line 51 for outer electric power supply, is electrically connected to the commercial power source 49 as an outer power source. That is, the power feeder 46, by the power supply line 51, takes in the electric power from the commercial power source 49 as the outer power source. The power supply line 51 includes a cable or the like. Further, the power feeder 46 is electrically connected to each of the battery unit 47 and the inverter device 48.

The power feeder 46 has a function of converting AC power (AC voltage), which is supplied from the commercial power source 49, into DC power (DC voltage) and outputting the converted power to the inverter device 48, a function of converting AC power, which is supplied from the commercial power source 49, into DC power and outputting the converted power to the battery unit 47, and a function of outputting, to the inverter device 48, the DC power from the battery unit 47. The power feeder 46 is so configured as to switch, by switching a mode, the function exerted. The power feeder 46 controls the current and voltage values of the supplied power.

The excavator 1 has the following three power feed modes which can be switched by the operating of a mode switch provided, for example, at the drive part 10. That is, the excavator 1 has a battery power feed mode in which the electric motor 12 is powered by the battery unit 47 only, an outer power feed mode in which the electric motor 12 is powered from the outer commercial power source 49 by the power feeder 46, and a storage mode in which power from the outer commercial power source 49 is stored in the battery unit 47 by the power feeder 46.

The outer power feed mode includes a case where at least one of the followings is performed: charging of the battery unit 47 by the power feed from the commercial power source 49 via the power feeder 46, and power feeding from the battery unit 47 to the electric motor 12. That is, the electric motor 12, in the battery power feed mode, is driven by the power feed from the battery unit 47, and in the outer power feed mode, is driven by the power feed from the commercial power source 49, and, as the case may be, receives, from the battery unit 47, supply of drive power.

The battery unit 47 is the power source provided for the excavator 1. The battery unit 47 is a unitary configuration of multiple battery modules. The battery module includes a secondary battery such as a lead acid battery and a lithium ion battery. The battery unit 47 supplies DC current to the inverter device 48.

Figure 5:
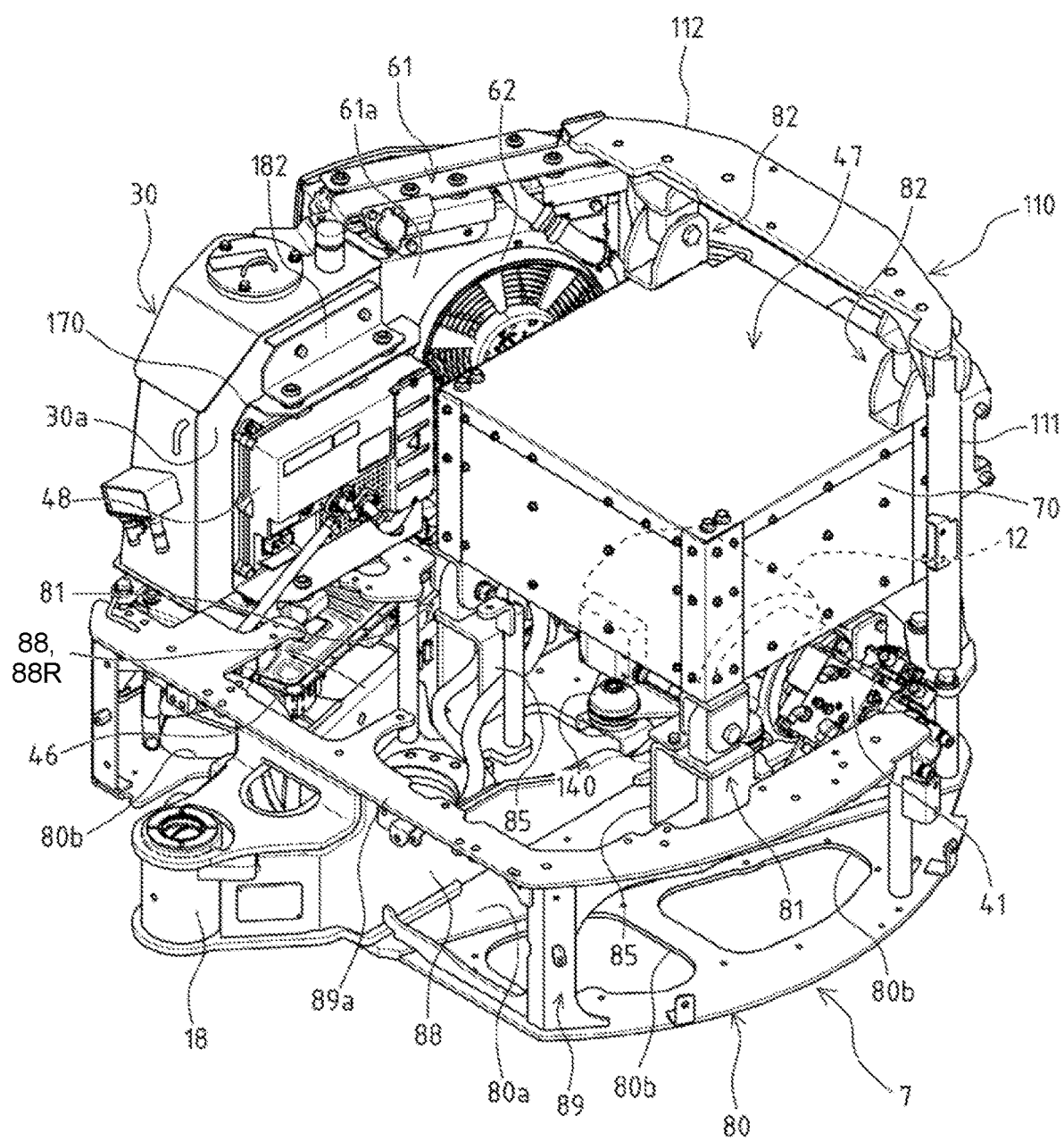
FIG. 5 is a left front perspective view of the one example of the placement mode of the device configuration provided for the excavator according to the one embodiment of the present invention.

The battery unit 47, in the back part of the swing frame 7, is placed in a position above the electric motor 12, as shown in FIGS. 4 and 5. In FIG. 4, the battery unit 47 is indicated by a double-dashed line for convenience.

The battery unit 47 has a cuboid-shaped battery body part 70, and, in the back part of the swing frame 7, is so provided as to position the battery body part 70 above the electric motor 12. The battery unit 47 is so provided that the front, back, left, and right faces of the battery body part 70 face the front, back, and left of the upper swing body 20B.

On the base plate part 80 included in the swing frame 7, the battery unit 47 is supported via a given support member. The base plate part 80 is a part that forms the bottom face part of the swing frame 7, and includes a horizontally placed plate-shaped frame member and the like. The base plate part 80 has a flat upper face 80a. The base plate part 80 is formed with a plurality of open parts 80b.

From the left side part to front part of the base plate part 80, there is provided a floor part frame 89 for providing the floor part 8. The floor part frame 89 includes a horizontal frame part 89a provided parallel to the base plate part 80. The front lower cover part 34 is provided in a mode of being bridged between the front edge part of the base plate part 80 and the front edge part of the horizontal frame part 89a.

On the base plate part 80, there is provided a pair of right and left longitudinal plates 88 placed along in a substantially front/back direction from the back side of the support bracket 18 provided in the right/left center part on the front side of the swing frame 7. The longitudinal plate 88 is fixed to the base plate part 80, forming a part of the swing frame 7.

The right longitudinal plate 88, about the back side, extends to the back end part of the swing frame 7, defining a place for the electric motor 12 and radiator 61. The left longitudinal plate 88, about the back side, extends to the vicinity on the front side of the electric motor 12, and the control valve 42 is placed on the left side of the left longitudinal plate 88. The right and left longitudinal plates 88 cause the front part to extend forward from the front lower cover part 34, forming the right and left side face parts of the support bracket 18.

As shown in FIG. 5; to the base plate part 80 of the swing frame 7, the battery unit 47 is supported by right and left lower vibration-proof support parts 81 that support the lower side of the battery unit 47 in a vibration-proof manner, and right and left upper vibration-proof support parts 82 that support the upper side of the battery unit 47 in a vibration-proof manner. The lower vibration-proof support part 81 is provided in the front end part of the battery unit 47, and the upper vibration-proof support part 82 is provided in the back end part of the battery unit 47.

To the base plate part 80, the lower vibration-proof support part 81 is provided on a gate-shaped support leg portion 85 provided on the upper face 80a. To the base plate part 80, the upper vibration-proof support part 82 is provided to a gate-shaped frame part 110 which is configured in substantially a gate. The gate-shaped frame part 110 includes a pair of right and left stay parts 111 standing on the base plate part 80 and a transverse bridge frame part 112 bridged between the right and left stay parts 111.

The electric motor 12 and the hydraulic pump 41 are placed horizontally in a space below the battery body part 70 above the base plate part 80. To the swing frame 7, the electric motor 12 and the hydraulic pump 41 (hereinafter referred to as "motor/pump unit") which are connected to each other via the coupling are supported by a plurality of vibration-proof support parts 140. In the present embodiment, as shown in FIG. 4, the vibration-proof support part 140 is provided in four places: two on the right and left on the front side of the motor/pump unit and two on the right and left on the back side of the motor/pump unit.

In the vibration-proof support part 140, a support stay extending from the motor/pump unit is supported to a given support part provided on the base plate part 80 of the swing frame 7. The vibration-proof support part 140 includes an elastic part formed by an elastic material such as a rubber material and a fixing portion for fixing the support stay, which is extended from the motor/pump unit, to the given support part on the swing frame 7's side.

The inverter device 48 is a device that directly or indirectly controls the power supplied to the electric motor 12. The inverter device 48 controls the power output to the electric motor 12, thereby to control the output of the electric motor 12. Specifically, the inverter device 48 converts the DC power, which is supplied from the battery unit 47, into AC power, and supplies the converted power to the electric motor 12. Further, to the electric motor 12, the inverter device 48 supplies, as a given voltage, AC power supplied from the commercial power source 49 via the power feeder 46.

Specifically, the inverter device 48 has an inverter circuit that generates AC power from DC power and supplies the generated power to the electric motor 12, an arithmetic control unit that controls the inverter circuit, and a rectifier circuit that converts the AC power, which is supplied from the commercial power source 49 via the power feeder 46, into DC power and boosts the converted power, and that outputs the boosted power to the inverter circuit. The arithmetic control unit includes a microcomputer, for example.

In the outer power feed mode, the inverter device 48, by the rectifier circuit, converts the AC power, which is supplied from the commercial power source 49 via the power feeder 46, into DC power, and outputs the converted power to the inverter circuit, then generates AC power by the inverter circuit and supplies the generated power to the electric motor 12. Meanwhile, in the battery power feed mode, the inverter device 48, by the inverter circuit, receives the input of DC power supplied from the battery unit 47, then generates AC power by the inverter circuit and supplies the generated power to the electric motor 12.

As shown in FIG. 4, the excavator 1 includes the radiator 61, as a cooling system, that cools the cool water supplied to the electric motor 12, the inverter device 48, the power feeder 46, etc. The radiator 61 is a heat exchanger for cooling various devices, and cools the cool water circulating in a specified cool flow path. An electric fan 62 is provided for the radiator 61. In the radiator 61, a communication part for air passage is formed, and air blown by the electric fan 62 passes through the communication part, thereby cooling the cool water.

As shown in FIG. 4, the radiator 61 has a substantially rectangular thick plate outline, and is standing on the right side in the back part of the swing frame 7. The radiator 61 is placed adjacent to the back side of the hydraulic oil tank 30. The radiator 61, in plan view, is provided in a shape inclined, relative to the front/back direction, in a direction of positioning the back side right/left inside, in such a manner as to be along the outline of the swing frame 7 which is substantially circular. In a side face part 61a inside the radiator 61, the electric fan 62 is so integrated with the radiator 61 as to cover most of the side face part 61a. The electric fan 62 is driven by electric power supplied from the commercial power source 49 or the battery unit 47. The electric power supplied from the commercial power source 49 or the battery unit 47 is, after the voltage being stepped down by a DC/DC converter (converter 230 described below), supplied to the electric fan 62, etc.

The placement configuration and mount structure of the inverter device 48 are described using FIGS. 6 to 10. The inverter device 48 is provided right/left inside (left side) the hydraulic oil tank 30 provided in the front part on the right side of the swing frame 7, i.e., on the swing center side of the upper swing body 20B. The inverter device 48 has a substantially rectangular thick plate-shaped outline, has a plate face direction vertical, and is so provided in a posture parallel to a left side face part 30a as to be along the left side face part 30a of the hydraulic oil tank 30.

The hydraulic oil tank 30 is placed on a tank support base 150 as a pedestal provided on the base plate part 80. On the base plate part 80, the tank support base 150 is provided in a fixed state.

The hydraulic oil tank 30, about a tank body part 130 thereof, has a substantially cuboid shape that is longitudinally long, and stands on the tank support base 150. The tank body part 130 has a shape having the right/left direction as the short direction and the front/back direction as the long direction in plan view, and having the right/left direction as the short direction and the up/down direction as the long direction in front view.

Figure 15:
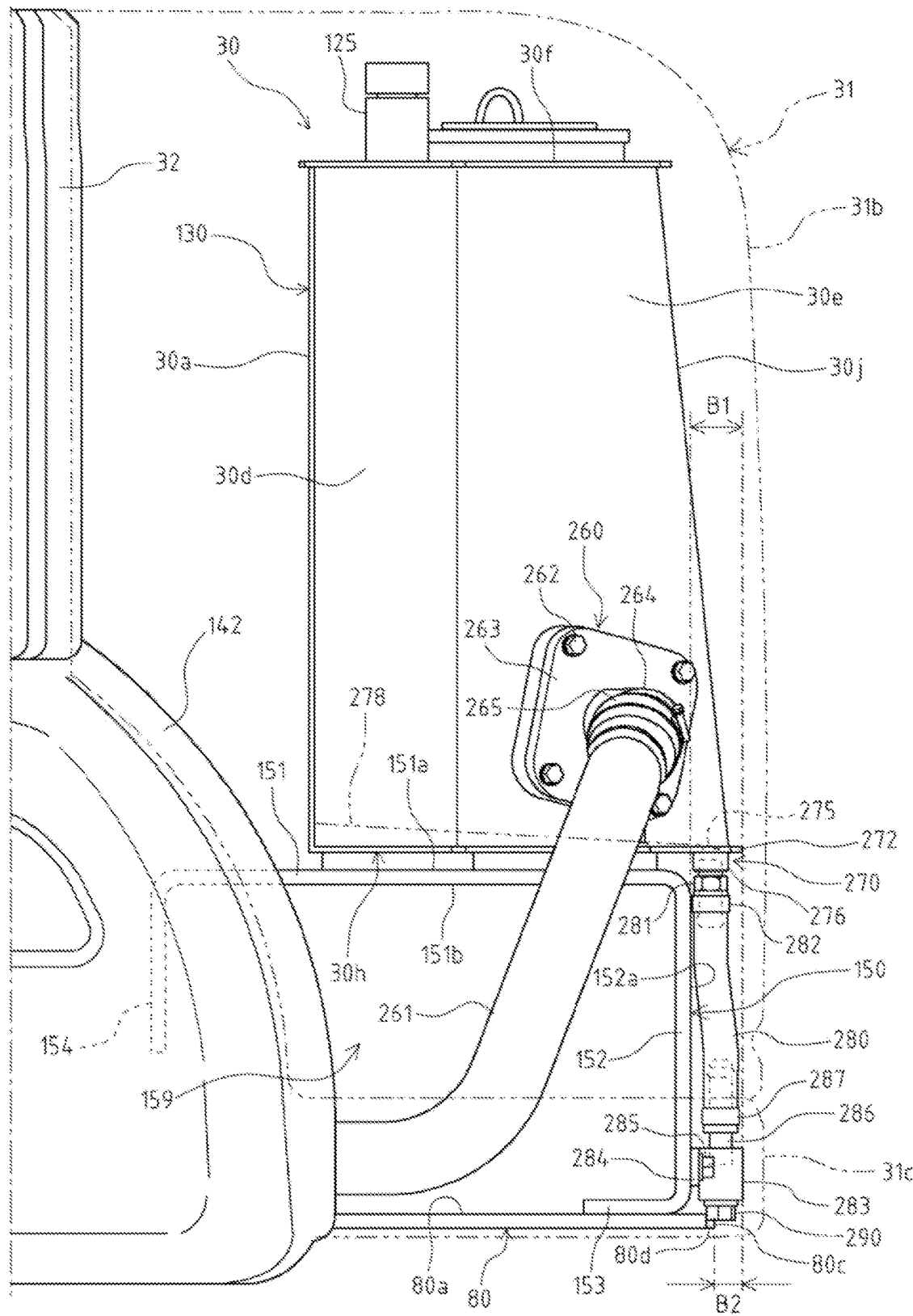
FIG. 15 is a diagram viewed from the back side showing a hydraulic oil tank and a drain structure according to an embodiment of the present invention.

The tank body part 130 has, as longitudinal face parts, a left side face part 30a along the front/back direction, a front face part 30b along the right/left direction, a right front inclined face part 30c that forms the front part of the right side face part, a back face part 30d that is the opposite face part of the front face part 30b, and a right back inclined face part 30e that is the face part between the back face part 30d and the right front inclined face part 30c and that forms the back part of the right side face part (see FIG. 15). The tank body part 130 has the right front inclined face part 30c inclined from the back side to the front side in a direction from the right/left outside to the inside, and the right back inclined face part 30e inclined from the back side to the front side in a direction from the right/left inside to the outside. The tank body part 130 has a bent shape where the right side is a convex side by the right front inclined face part 30c and the right back inclined face part 30e so that the right side face part does not extend from the arc-shaped outline along which the swing frame 7 extends in plan view.

Further, the tank body part 130 has, as upper face parts, a horizontal back upper face part 30f and a front inclined face part 30g. The front inclined face part 30g is a forward-down inclined face part. Further, the tank body part 130 has a horizontal bottom face part 30h. A fueling port 125 is provided on the back upper face part 30f. The tank support base 150 includes a plate-shaped member formed to be bent into a given shape, and has a support face part 151, an outside face part 152, a lower fixed face part 153, and an inside face part 154. The support face part 151 is a horizontal face part that forms the upper face part of the tank support base 150, and has a substantially rectangular outline in plan view. The upper face of the support face part 151 becomes a support face 151a for supporting the hydraulic oil tank 30 and the like. The tank support base 150, in accordance with the arc-shaped outline along which the swing frame 7 extends in plan view, is provided to be so inclined that the front side faces right and left inside (left side).

The outside face part 152 is a vertical face part formed to be bent downward from the right edge part of the support face part 151. The lower fixed face part 153 is a horizontal face part formed to be bent from the lower end part of the outside face part 152 to right/left inside. The inside face part 154 is a vertical face part formed to be bent downward from the left edge part of the support face part 151. The lower fixed face part 153 is narrower than the support face part 151, and the inside face part 154, compared with the outside face part 152, has a shorter length extending downward from the support face part 151.

Figure 6:
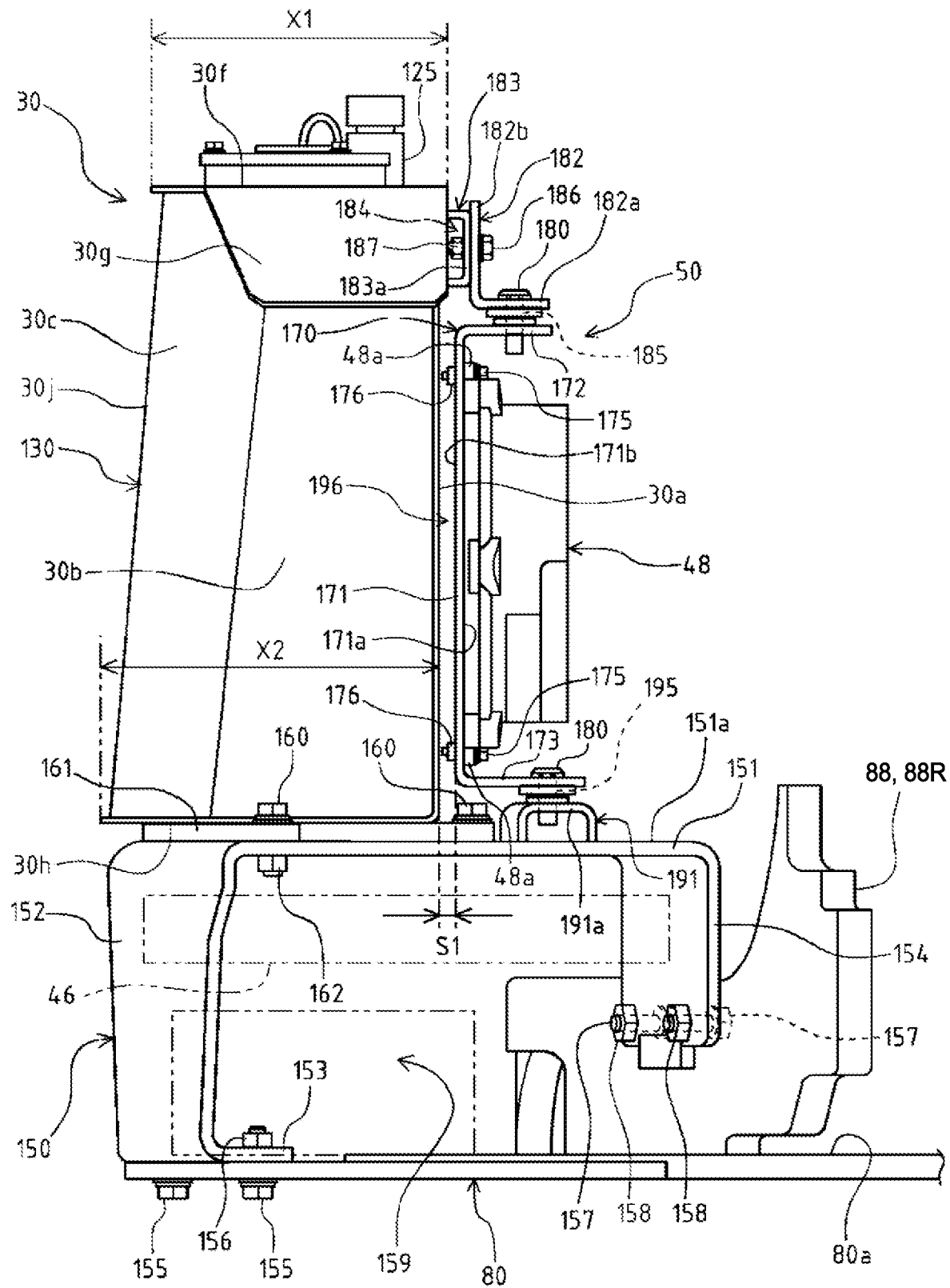
FIG. 6 is a front view of support configurations of a hydraulic oil tank and inverter device according to the one embodiment of the present invention.
Figure 7:
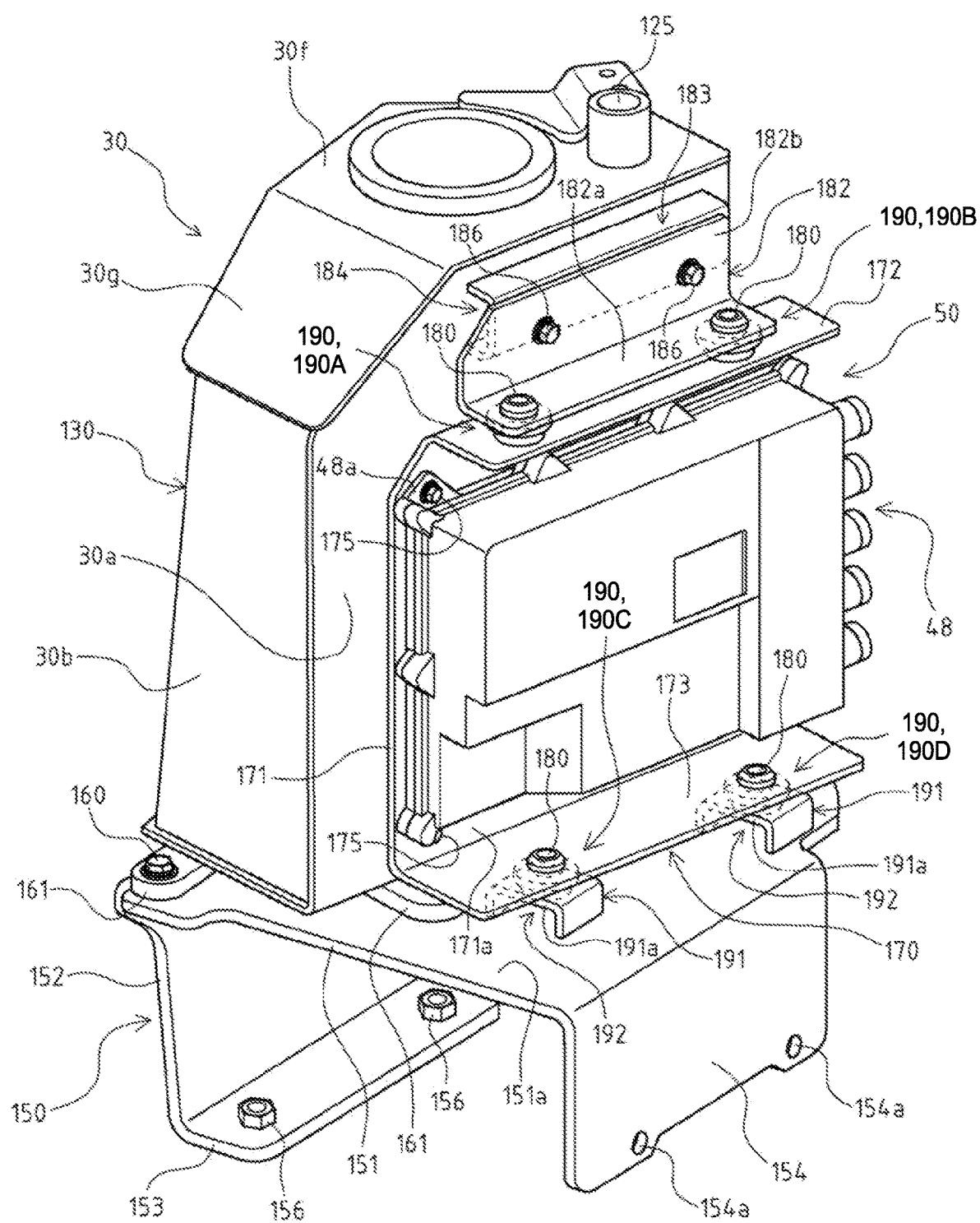
FIG. 7 is a perspective view of the support configurations of the hydraulic oil tank and inverter device according to the one embodiment of the present invention.

The tank support base 150, as shown in FIG. 6, is fixed to the base plate part 80 in a state where the lower fixed face part 153 extends along the upper face 80a of the base plate part 80. At two fixing parts in front and back (see FIG. 6), the lower fixed face part 153 is fixed to the base plate part 80 by fixing bolts 155. The fixing bolt 155 passes through the base plate part 80 and the lower fixed face part 153 from below, and is screwed into a nut part 156 provided on the lower fixed face part 153. The lower fixed face part 153 is formed with a hole part 153a for the fixing bolt 155 to pass through (see FIG. 8).

Further, the tank support base 150, in a state where the lower part of the inside face part 154 is caused to extend along the right side of a right longitudinal plate 88R of the right and left longitudinal plates 88, causes the inside face part 154 to be fixed to the longitudinal plate 88R. The inside face part 154 is fixed to the longitudinal plate 88R by fixing bolts 157 at two fixing parts in the front and back (see FIG. 6). The fixing bolt 157 passes through the longitudinal plate 88R and the inside face part 154 from the left side, and is screwed into the nut part 158 on the right side of the inside face part 154. A hole part 154a for the bolt 157 to pass through is formed in the inside face part 154.

Thus, the tank support base 150 is fixed to each of the base plate part 80 and the longitudinal plate 88R in a mode to bridge between them. On the base plate part 80, the tank support base 150 forms a space part 159 that is open on both front and back sides. On both the front and back sides of the space part 159, the gate-shaped tank support base 150, the horizontal base plate part 80, and the longitudinal plate 88R vertically provided on the base plate part 80 form a substantially rectangular open part.

In several places, the hydraulic oil tank 30 is fixed to the support face part 151 of the tank support base 150 by fixing bolts 160. The hydraulic oil tank 30 has a plate-shaped fixing plate part 161 fixed to the bottom face part 30h of the tank body part 130, and the fixing plate part 161 is fixed to the support face part 151 by the fixing bolt 160.

Figure 12:
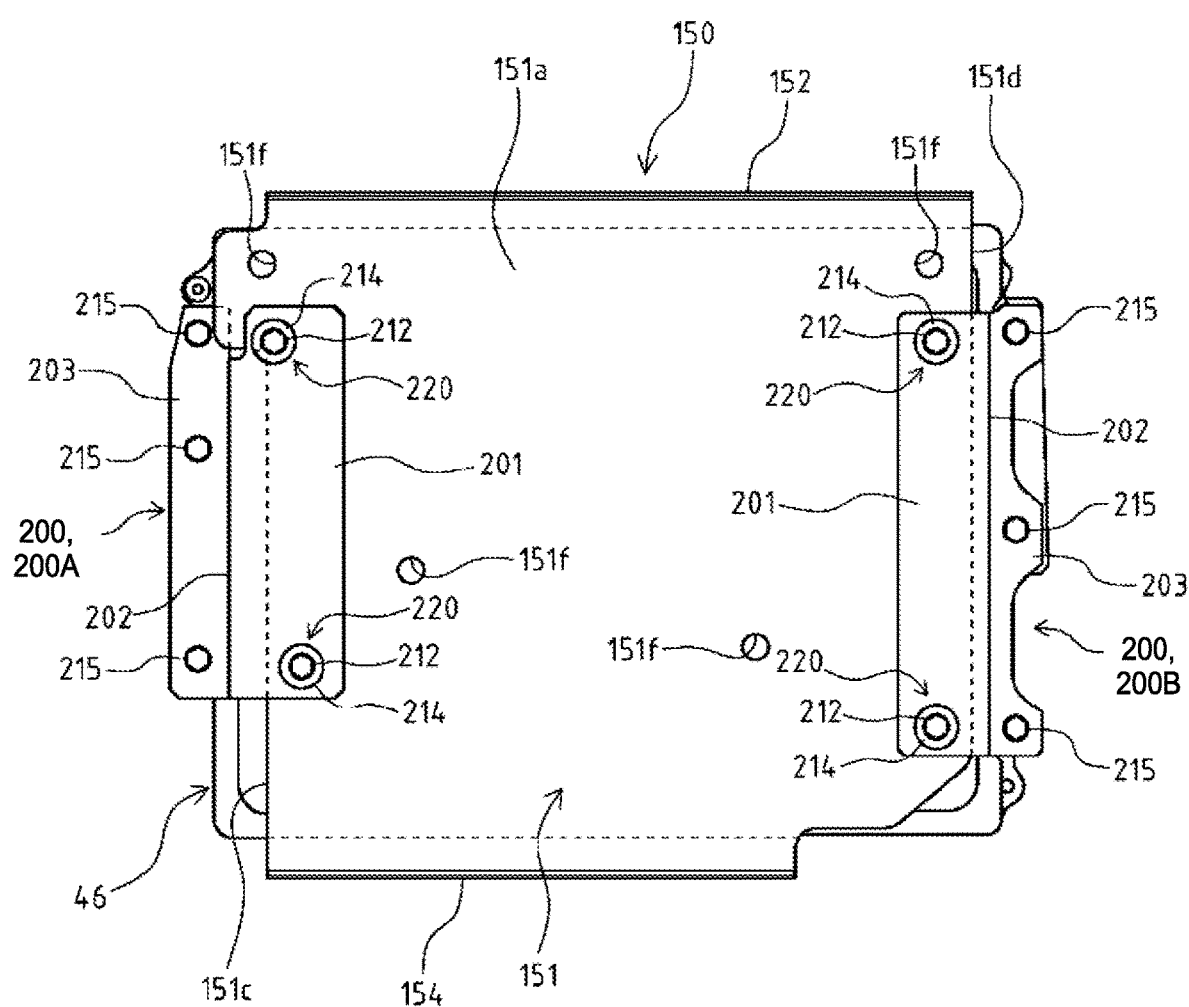
FIG. 12 is a plan view of the placement configuration of the power feeder according to the one embodiment of the present invention.
Figure 13:
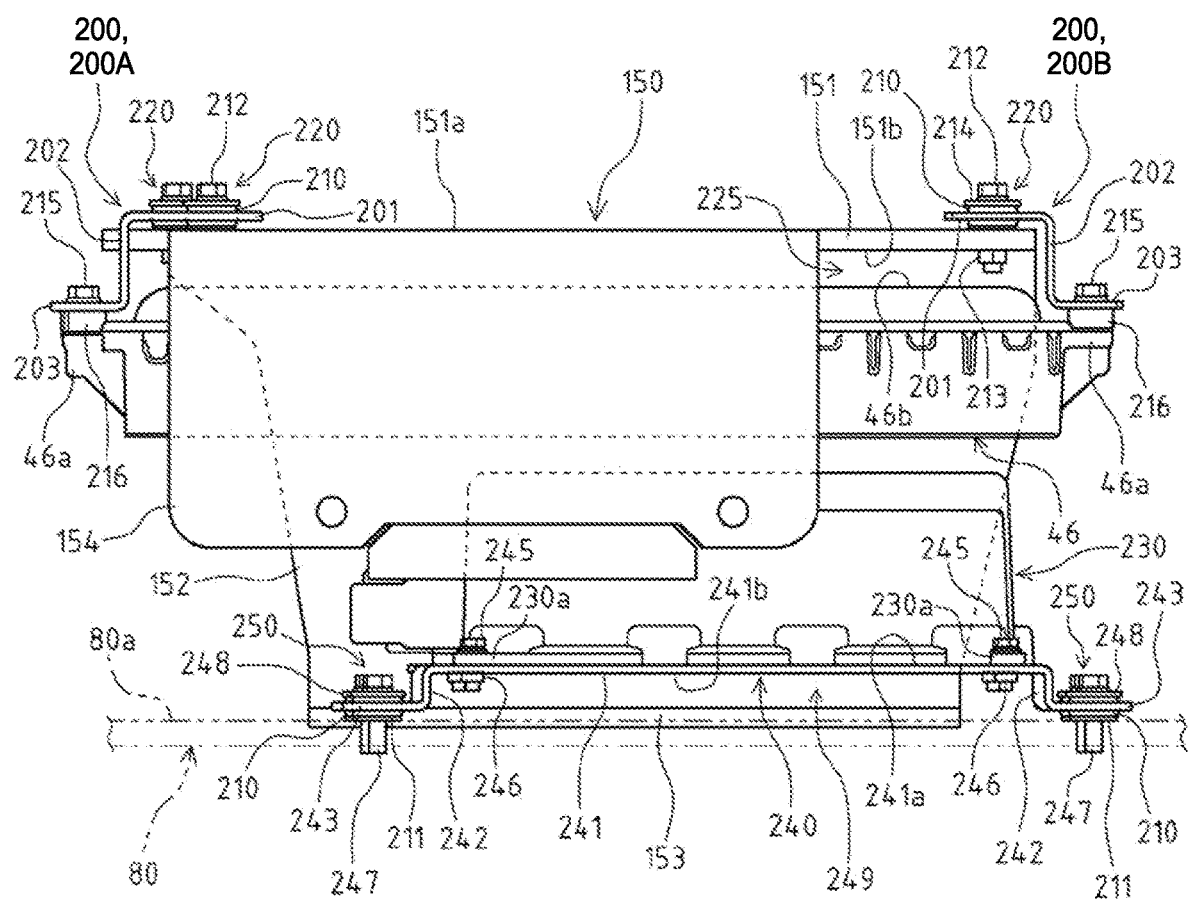
FIG. 13 is a side view of the placement configuration of the power feeder and converter according to the one embodiment of the present invention.
Figure 14:
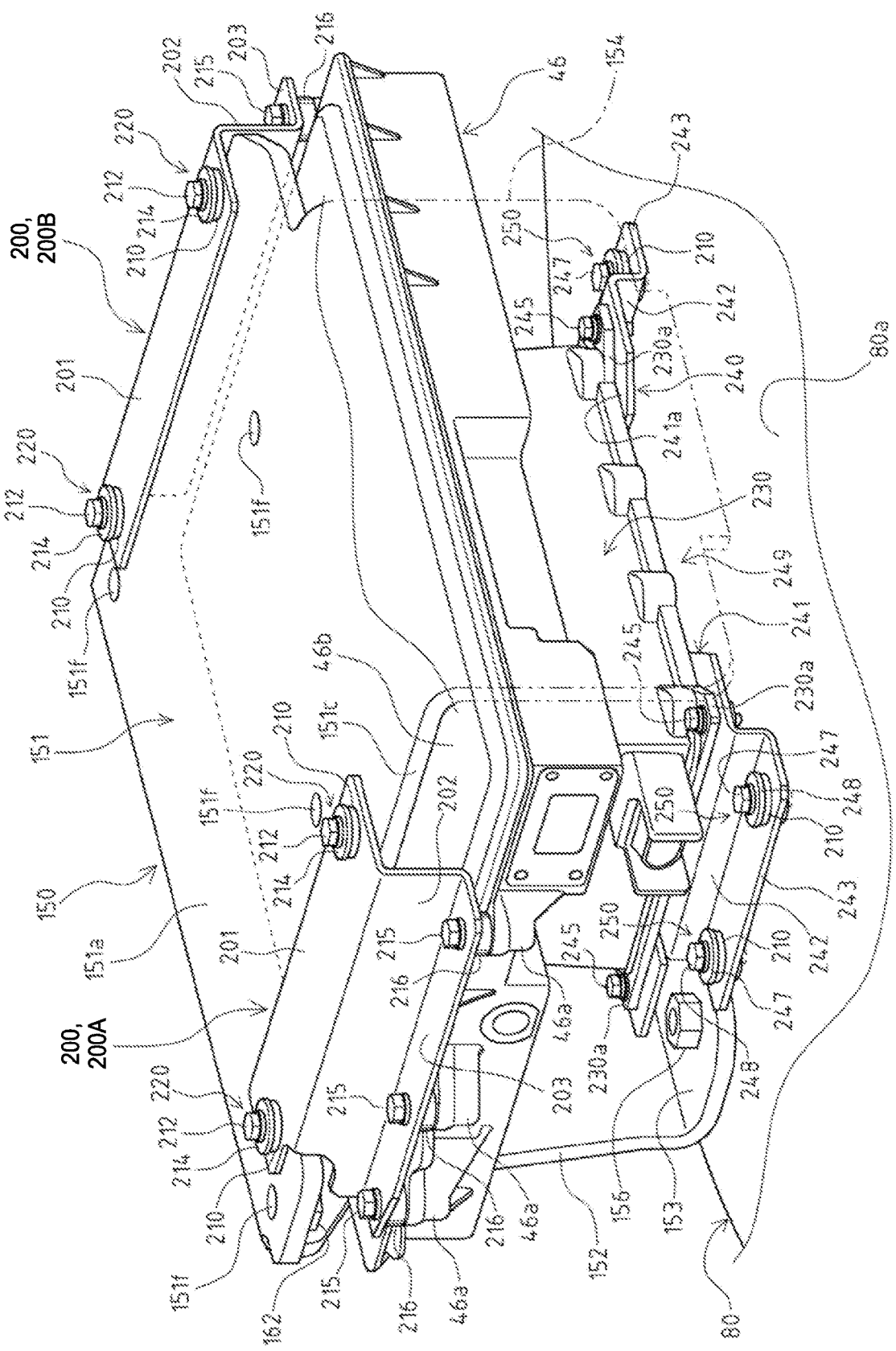
FIG. 14 is a perspective view of the placement configuration of the power feeder and converter according to the one embodiment of the present invention.

The fixing bolt 160, from above, penetrates the end part of the fixing plate part 161 and the support face part 151, and is screwed into a nut part 162 provided on the lower side of the support face part 151. The hydraulic oil tank 30, by interposing the fixing plate part 161 between the tank body part 130 and the support face part 151 of the tank support base 150, is supported and fixed to the support face part 151, in a state where a gap equal to the thickness of the fixing plate part 161 is formed between the bottom face part 30h of the tank body part 130 and the support face 151a of the tank support base 150. In four places, the support face part 151 is formed with hole parts 151f through each of which the fixing bolt 160 passes (see FIG. 12).

The inverter device 48, in a state of being fixed to the mount support frame 170, is supported in a vibration-free manner to each of the hydraulic oil tank 30 and tank support base 150. That is, the inverter device 48, together with the mount support frame 170, constitutes an integral supported body 50 (see FIG. 8), and the integral supported body 50 is supported in a vibration-free manner to each of the hydraulic oil tank 30 and tank support base 150.

The mount support frame 170 includes a plate-shaped member formed to be bent into a given shape. The mount support frame 170 has a vertical support plate part 171 that receives the mounting of the inverter device 48, a horizontal upper support face part 172 provided on the upper side of the support plate part 171, and a horizontal lower support face part 173 provided on the lower side of the support plate part 171.

The support plate part 171 is a rectangular plate-shaped part that has substantially the same size as the outline dimension of the inverter device 48, according to the substantially rectangular outline dimension of the inverter device 48 in left side view. To the support plate part 171, the inverter device 48 is fixed by fixing bolts 175 at the four corners in a state of covering substantially the entirety of a left side face 171a which is the inside (left side) plate face of the support plate part 171. The fixing bolt 175 passes through flange portions 48a formed at the four corners of a casing of the inverter device 48 and through the support plate part 171, and is screwed into a nut part 176 provided on a right side face 171b which is the outside (right side) of the support plate part 171.

The upper support face part 172 is a horizontal face part formed to be bent from the upper edge part of the support plate part 171 toward the left. The lower support face part 173 is a horizontal face part formed to be bent from the lower edge part of the support plate part 171 toward the left.

The supported body 50 including the inverter device 48 is supported to each of the hydraulic oil tank 30 and the tank support base 150 by a vibration-proof rubber 180 which is a vibration-proof member. The parts supported by the vibration-proof rubber 180 are provided at two places for each of the upper support face part 172 and the lower support face part 173.

The part for supporting the inverter device 48 to the hydraulic oil tank 30 is to be described. The upper support face part 172 is supported via an upper support stay 182 to an upper mount seat 183 provided on the left side face part 30a of the hydraulic oil tank 30. The upper support stay 182 is a longitudinal angle member, and has a support face part 182a for interposing the vibration-proof rubber 180, and a fixing face part 182b which serves as a part for fixing to the upper mount seat 183, forming a substantially "L"-shaped transvers cross-sectional shape by these face parts.

The upper mount seat 183 is provided as a part protruding to the flat left side face part 30a. The upper mount seat 183 is provided, by fixing, through welding or the like, a longitudinal U-shaped steel member, which has a substantially "U"-shaped transverse cross-sectional shape, to the left side face part 30a with the open side being the left side face part 30a side. The upper mount seat 183, with its longitudinal direction along the upper edge part of the left side face part 30a, is provided in the upper end part of the left side face part 30a.

The upper mount seat 183, together with the left side face part 30a of the hydraulic oil tank 30, forms a substantially rectangular cylindrical hollow part 184 with both front and back end sides open. The upper mount seat 183 has a side face part, which is parallel to the left side face part 30a, as a support face part 183a that forms a vertical support face. The support face part 183a is away from the left side face part 30a by the width dimension of the upper and lower face parts of the upper mount seat 183.

Figure 8:
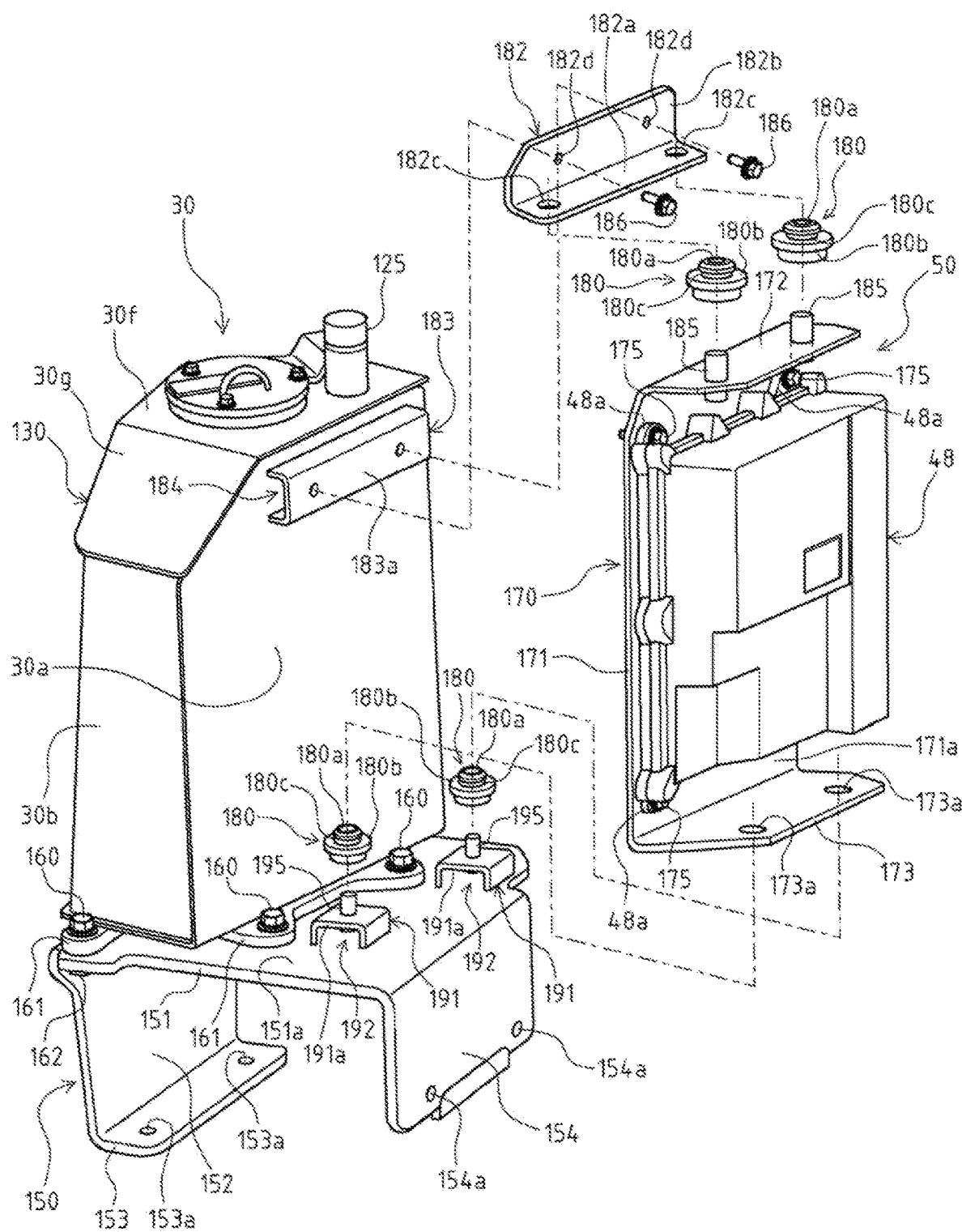
FIG. 8 is an exploded perspective view of the support configuration of the inverter device according to the one embodiment of the present invention.

The vibration-proof rubber 180 is formed by an elastic material such as rubber materials including natural rubber and nitrile rubber. As shown in FIG. 8, the vibration-proof rubber 180 has a rotator shape having a given central axis as a center, and a hole part 180a through the central axis part. Further, the vibration-proof rubber 180 has a brim-shaped expanded radial part 180b in the middle part in the axial direction, and has an outer peripheral groove 180c on the upper side of the expanded radial part 180b.

In the part for supporting the inverter device 48 to the hydraulic oil tank 30, i.e., in the upper support part, the vibration-proof rubber 180 is interposed between the upper support face part 172 of the mount support frame 170 and the upper support stay 182. To the upper support face part 172, the vibration-proof rubber 180 is supported in a state where a cylindrical support shaft 185 protruding upward from the upper support face part 172 is inserted into the hole part 180a. Further, to the upper support stay 182, the vibration-proof rubber 180 is engaged in a state where the inner peripheral edge part of a circular through hole part 182c formed in the support face part 182a fits to the outer peripheral groove 180c.

The vibration-proof rubber 180 mounted to each of the upper support face part 172 and the upper support stay 182 causes the part below the outer peripheral groove 180c to be sandwiched between the upper support face part 172 and the support face part 182a of the upper support stay 182. Further, the vibration-proof rubber 180 causes the part above the outer peripheral groove 180c to protrude from the through hole part 182c to the upper side of the support face part 182a. The vibration-proof rubber 180 causes its upper part to pass through the through hole part 182c from the lower side by an elastic deformation.

The upper support stay 182, in a state where the fixing face part 182b is fitted to the support face part 183a of the upper mount seat 183, is fixed to the upper mount seat 183 at two places in the front and back by fixing bolts 186. The fixing bolt 186 passes through the fixing face part 182b and the support face part 183a, and is screwed into a nut part 187 provided on the back side of the support face portion 183a. The fixing face part 182b and the support face part 183a have hole parts 182d and 183d, respectively, to cause the fixing bolts 186 to pass through.

The part for supporting the inverter device 48 to the tank support base 150 is to be described. Via the vibration-proof rubber 180, the lower support face part 173 is supported to a lower mount seat 191 provided on the support face 151a of the support face part 151. Corresponding to the respective vibration-proof rubbers 180, the lower mount seats 191 are provided at two places in the front and back.

To the flat support face 151a, the lower mount seat 191 is provided as a protruding part. The lower mount seat 191 is provided, by fixing through welding or the like, a U-shaped steel member, which has a substantially "U"-shaped transverse cross-sectional shape, to the support face 151a with the open side being the support face 151a side. In the site on the left side of the hydraulic oil tank 30 on the support face 151a, the lower mount seat 191 is so provided that the direction of the front and back open sides is aligned with the direction of the front and back open sides of the support face part 151.

The lower mount seat 191, together with the support face 151a of the support face part 151, forms a hollow part 192 that is open at both front and back end sides. The lower mount seat 191 has an upper face part, which is parallel to the support face 151a, as a support face part 191a that forms a horizontal support face. The support face part 191a is away from the support face 151a by the vertical dimension of the right and left face parts of the lower mount seat 191.

In the part for supporting the inverter device 48 to the tank support base 150, i.e., in the lower support part, the vibration-proof rubber 180 is interposed between the lower support face part 173 of the mount support frame 170 and the lower mount seat 191. To the lower mount seat 191, the vibration-proof rubber 180 is supported in a state where a cylindrical support shaft 195 protruding upward from the support face part 191a is inserted into the hole part 180a. Further, to the lower support face part 173, the vibration-proof rubber 180 is engaged in a state where the inner peripheral edge part of the circular through hole part 173a formed in the lower support face part 173 fits to the outer peripheral groove 180c.

The vibration-proof rubber 180 mounted to each of the lower mount seat 191 and the lower support face part 173 causes the part below the outer peripheral groove 180c to be sandwiched between the lower mount seat 191 and the lower support face part 173. Further, the vibration-proof rubber 180 causes the upper part above the outer peripheral groove 180c to protrude from the through hole part 173a to the upper side of the lower support face part 173. The vibration-proof rubber 180 causes its upper part to pass through the through hole part 173a from the lower side by an elastic deformation.

As described above; via the mount support frame 170 to the hydraulic oil tank 30 and the tank support base 150, the inverter device 48 is supported, in four places, two on the upper side and two on the lower side, by a vibration-proof support part 190 using the vibration-proof rubber 180. Vibration-proof support parts 190A, 190B in upper two places are provided in a position closer to the front end and in a position closer to the back end of the inverter device 48, respectively. Similarly, vibration-proof support parts 190C and 190D in lower two places are provided in a position closer to the front end and in a position closer to the back end of the inverter device 48, respectively. The upper and lower vibration-proof support parts 190A and 190C which are positioned on the front side, and the upper and lower vibration-proof support parts 190B and 190D which are positioned on the back side are positioned in substantially the same position in the front/back direction, respectively.

Further, the mount support frame 170, which supports the inverter device 48, is so provided to the hydraulic oil tank 30 as to cover most of the left side face part 30a, except for the upper and front edge parts. The inverter device 48 is provided is a state of being supported on the tank support base 150 that supports the hydraulic oil tank 30.

The inverter device 48, which is supported in a vibration-free manner at four points as described above, is an example of the electric device provided, to the hydraulic oil tank 30, in a position spaced apart from the hydraulic oil tank 30 as the side face (30a) of the hydraulic oil tank 30. In the present embodiment, the inverter device 48 causes the support plate part 171 of the mount support frame 170 to be interposed between the inverter device 48 and the hydraulic oil tank 30, and the support plate part 171 is spaced apart from the side face of the hydraulic oil tank 30.

The support plate part 171 is a face part parallel to the left side face part 30a of the hydraulic oil tank 30. Then, the mount support frame 170 is provided in a state of forming the gap between the support plate part 171 and the left side face part 30a of the hydraulic oil tank 30. That is, a gap 196 having a dimension 51 is present between the right side face 171b of the support plate part 171 and the left side face part 30a of the hydraulic oil tank 30 (see FIG. 6). The gap 196 is a space part between the right side face 171b and the left side face part 30a which are each a vertical face along the front/back direction and which are opposite each other in the right/left direction.

Thus, the inverter device 48 has the support plate part 171 interposed, via the gap 196, between the inverter device 48 and the left side face part 30a of the hydraulic oil tank 30. Further, there is no limitation on the presence or absence of a gap between the support plate part 171 and the inverter device 48.

Further, the excavator 1 of the present embodiment includes the electric fan 62, which is attached to the left side of the radiator 61, as a fan for taking air into a housing space 197 of the hydraulic oil tank 30. The housing space 197 for housing the hydraulic oil tank 30 is a space inside the right cover part 31 which forms an exterior cover part of the tank part 9 provided on the right of the drive part 10 (see FIG. 10). Further, FIG. 10 schematically shows the arrow cross section in a position A-A in FIG. 9.

Further, an open part 198 that communicates the housing space 197 to outside is formed in a site which is of the exterior cover part forming the housing space 197 of the hydraulic oil tank 30 and which is in front of and below the hydraulic oil tank 30. The open part 198 is formed in the front lower cover part 34 which is of the exterior cover part and which covers the front lower part of the upper swing body 20B. The open part 198 is provided in a position below the floor part 8 extended from the drive seat support base 14 to the front end of the upper swing body 20B, and is formed at the front end of the upper swing body 20B.

Figure 9:
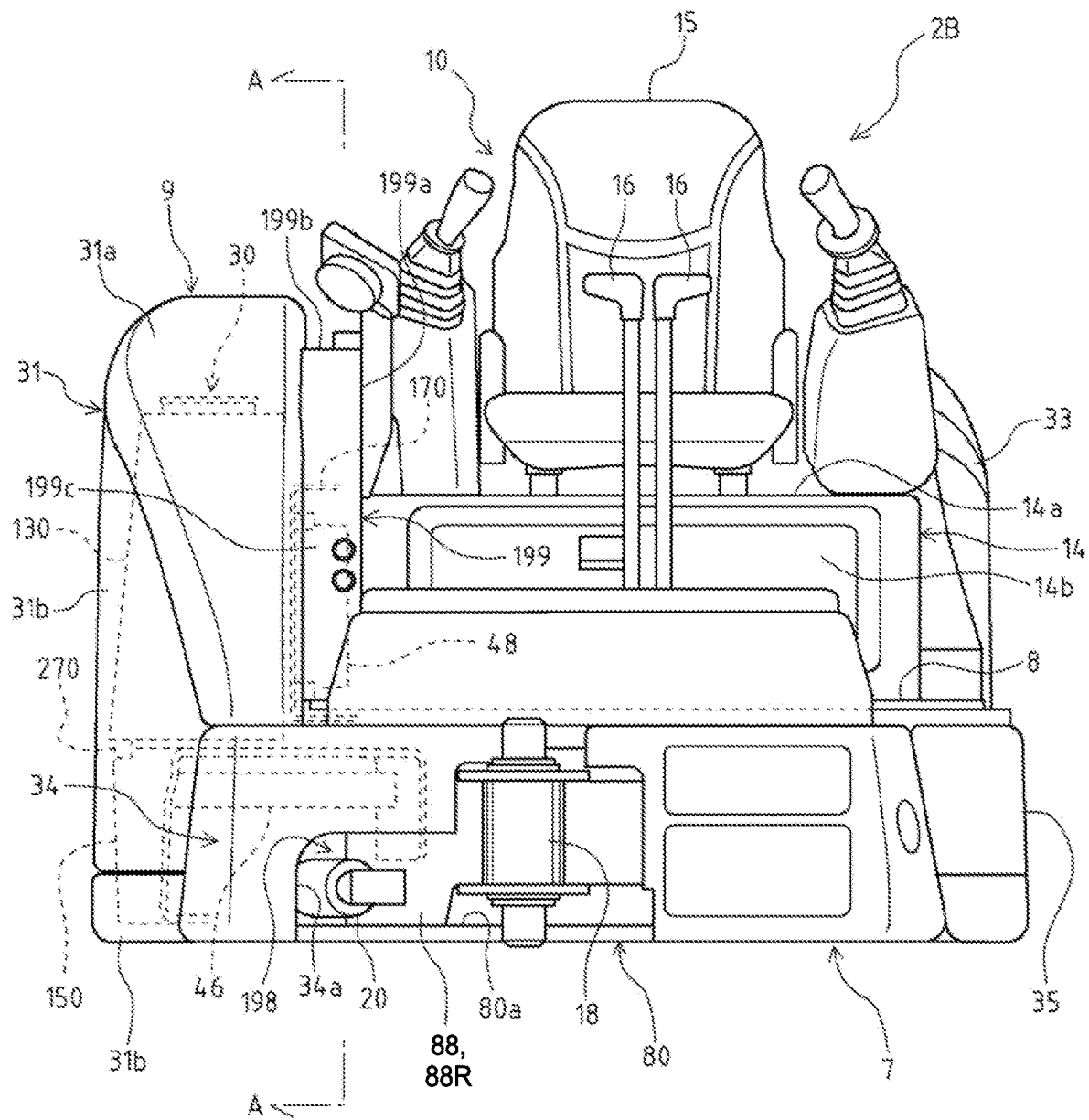
FIG. 9 is a front view of a configuration of a part of an upper swing body according to the one embodiment of the present invention.
Figure 10:
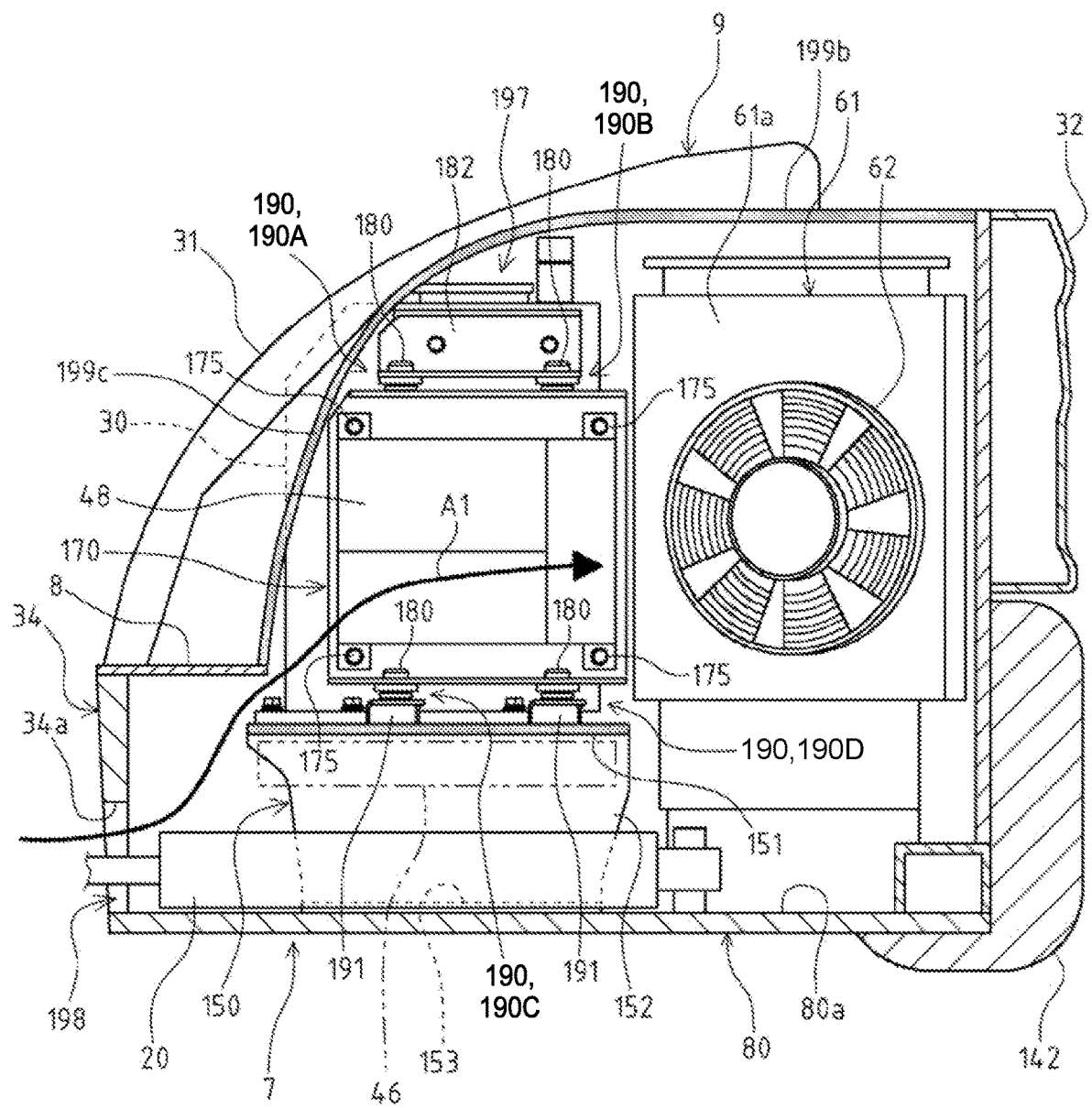
FIG. 10 is a left side cross-sectional view of the part of the upper swing body according to the one embodiment of the present invention.

As shown in FIG. 9, the open part 198, in the front lower cover part 34, is formed on the right side of the support bracket 18 that supports the excavation device 3. By a cutout opening 34a so formed as to be continuous with the open part for causing the support bracket 18 to protrude forward in the right/left center of the front lower cover part 34, the base plate part 80, and a right side wall 18a of the support bracket 18, the open part 198 is so formed as to form a substantially rectangular open part in front view. Further, the swing-dedicated hydraulic cylinder 20 is placed in the space part 159 formed by the tank support base 150, and extends forward from the open part 198.

In this configuration, the inverter device 48 is provided between the open part 198 and the electric fan 62. As shown in FIGS. 4 and 10, in the right edge part on the base plate part 80, the hydraulic oil tank 30 and the radiator 61 stand arranged in the front/back in a manner to be housed, in plan view, within the arc-shaped outline along which the swing frame 7 extends. In particular, in the back part of the base plate part 80, the radiator 61, from the front side to the back side, is provided in an inclined shape from the outside (right side) to the inside (left side) in the right/left direction, in plan view.

Then, the inverter device 48 is so provided as to be along the side face on the inside (left side) of the hydraulic oil tank 30, and the electric fan 62 is so provided as to be along the side face on the inside (left side) of the radiator 61. Meanwhile, the open part 198 is formed in front of and below the hydraulic oil tank 30. According to this configuration, the open part 198, the inverter device 48, and the electric fan 62 are placed in order from front to back in the front/back direction.

Further, the excavator 1 of the present embodiment includes the drive part 10 having the drive seat 15 placed on the drive seat support base 14 provided behind the floor part 8. The drive seat support base 14 has a horizontal upper face part 14a that supports the drive seat 15, and a front face part 14b that vertically stands from the back edge part of the floor part 8.

In this configuration, the electric fan 62 is placed in a position on the right side of the drive seat support base 14, and in the edge part on the right side of the upper swing body 20B. Further, the hydraulic oil tank 30 is placed adjacent to the front of the electric fan 62. Further, the electric motor 12 is placed in a position below the drive seat support base 14, and in the back part of the upper swing body 20B. Then, an inside cover 199 as a cover which covers the inverter device 48 is provided between the floor part 8 and the right cover part 31 which is a cover part covering the hydraulic oil tank 30.

The inside cover 199 forms a cover part that protrudes in a stepped shape toward the left in the left side face part of the right cover part 31, as shown in FIGS. 2, 9 and 10. The inside cover 199 has an inside face part 199a as left side face part, a flat upper face part 199b, and a curved front face part 199c formed on the front side of the upper face part 199b.

The inside cover 199, in left side view, is positioned within the outline of the right cover part 31 on the upper and front sides. That is, the inside cover 199, in left side view, is so provided as not to extend beyond the outline of the right cover part 31 on the upper and front sides, respectively. The inside cover 199 has the upper face part 199b positioned below the upper edge of the right cover part 31, and the curved front face part 199c positioned inside (back lower side) the outline of the right cover part 31 in side view.

The inside face part 199a is a vertical face part along the front/back direction, and stands from the right edge part of the horizontal floor part 8. Further, the inside face part 199a is so provided that the front lower part thereof forms a right angle in cross sectional plan view in combination with the front face part 14b of the drive seat support base 14.

The upper face part 199b is provided in the back part of the inside cover 199 in the front/back direction. The curved front face part 199c is a continuous face part on the front side of the upper face part 199b, and is curved forward and downward. The lower end of the curved front face part 199c reaches the floor part 8. The upper face part 199b and the curved front face part 199c form a series of face parts with substantially constant dimensions in the right/left direction, and in the inside cover 199, form a leftward protruding width from the left side face part of the right cover part 31.

The inner space of the inside cover 199 is a space part continuous, on the left side, to the housing space 197 of the hydraulic oil tank 30, and substantially the entirety of the inverter device 48 supported to the mount support frame 170 is placed inside the inside cover 199 (see FIG. 9). About the right/left direction, the hydraulic oil tank 30 is positioned in the housing space 197 on the right of the part covered with the inside cover 199. In the interior of the inside cover 199, the radiator 61 and the electric fan 62 are positioned behind the inverter device 48 (see FIG. 10).

As described above, in the drive part 10; on the right of the feet of the operator seated in the drive seat 15, there is provided the inside cover 199 that, as a cover part rising from the floor part 8, covers the inverter device 48.

The placement configuration and mount structure of the power feeder 46 is to be described using FIGS. 11 to 14. The power feeder 46 is placed below the hydraulic oil tank 30, and is so provided as to be supported to the tank support base 150 that supports the hydraulic oil tank 30.

The tank support base 150 forms the space part 159 on the back side of the support face part 151 that supports the hydraulic oil tank 30, and the power feeder 46 is provided in a state of being supported on the back side of the support face part 151 of the tank support base 150. That is, in the present embodiment, the power feeder 46 is an example of a second electric device so provided as to be supported to the back side of the support face part 151.

The power feeder 46 has a substantially rectangular thick plate-shaped outline, has a plate face direction horizontal, and is so supported in a posture parallel to the support face part 151 as to extend along a lower face 151b which is the back face of the support face part 151. The power feeder 46 has substantially the same size as the support face part 151 which is substantially rectangular in plan view, and its substantially rectangular plan view outline is so provided as to be aligned with the plan view outline of the support face part 151. The power feeder 46 has its front and back edge parts extending relative to front and back end faces 151c, 151d of the support face part 151 (see FIG. 12).

The power feeder 46, on both its front and back sides, is supported to the support face part 151 by support plates 200 (200A, 200B). The support plate 200 is supported in a vibration-proof manner to the support face part 151, and the power feeder 46 is supported in a vibration-proof manner via the support plate 200 to the support face part 151. The part supported by the front support plate 200A and the part supported by the back support plate 200B are configured symmetrically at the front and back, and have the same support structure as each other.

The support plate 200 includes a plate-shaped member formed to be bent into a given shape. The support plate 200 is a longitudinal support member having a substantially crank-shaped transverse cross-sectional shape, is provided in a state that its longitudinal direction is along the front or back edge part of the support face part 151, and is fixed to each of the support face part 151 and the power feeder 46.

The support plate 200 has an upper horizontal face part 201, a longitudinal face part 202, and a lower horizontal face part 203, as face parts that form the substantially crank-shaped transverse cross section. The upper horizontal face part 201 and the lower horizontal face part 203 are horizontal face parts parallel to each other, and the front edge part of the upper horizontal face part 201 and the back edge part of the lower horizontal face part 203 are connected by the vertical longitudinal face part 202.

The support plates 200, in a state where the upper horizontal face parts 201 overlap the upper sides in the front and back edge parts of the support face part 151, are supported to the support face part 151 in a vibration-proof manner by the vibration-proof rubbers 210 as vibration-proof members. For each of the front and back support plates 200, the part supported by the vibration-proof rubber 210 is provided at two places near both end parts of the support plate 200 in the longitudinal direction.

Figure 11:
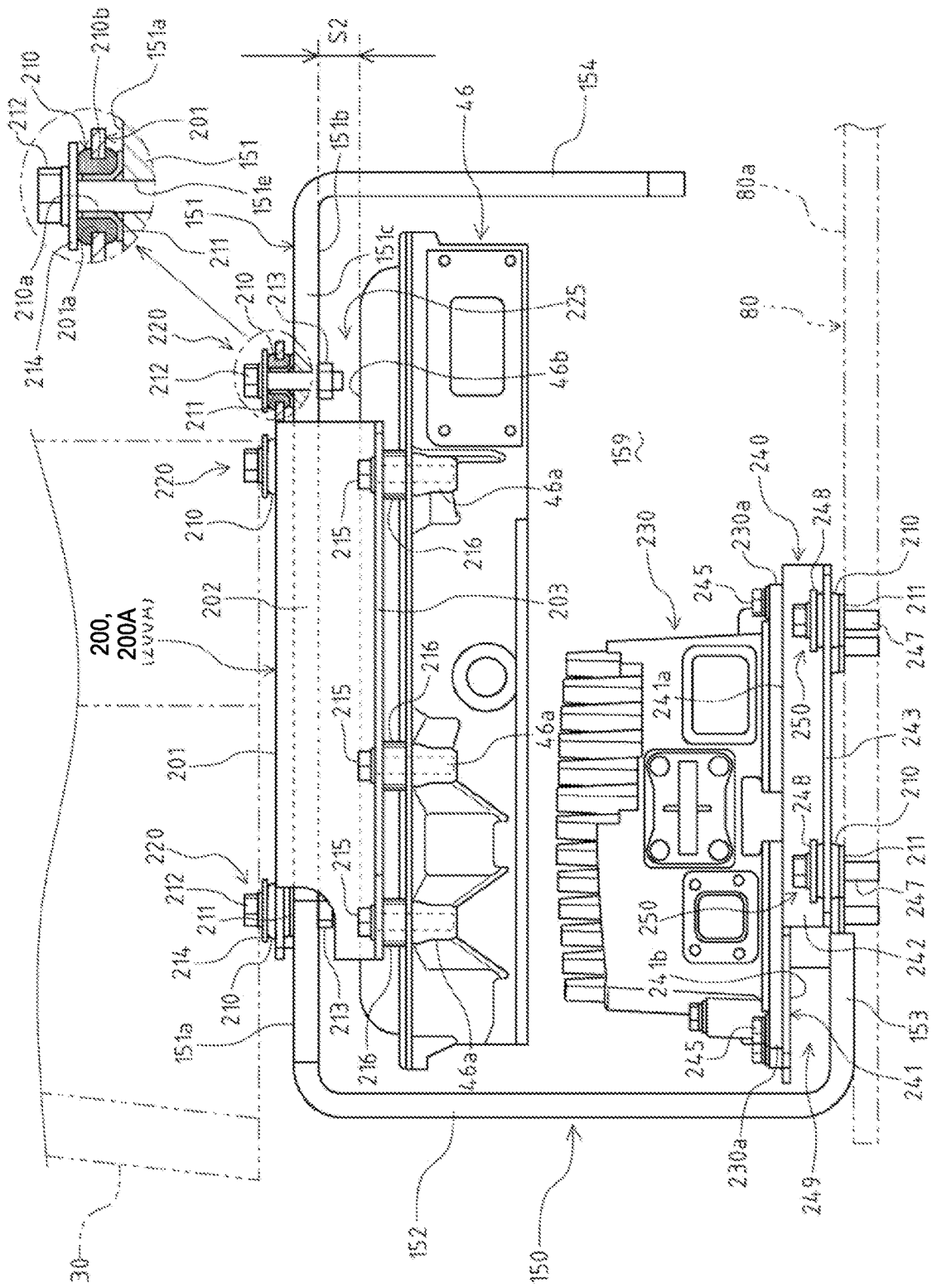
FIG. 11 is a front view of a placement configuration of a power feeder and converter according to the one embodiment of the present invention.

The vibration-proof rubber 210 is formed by an elastic material such as a rubber material including natural rubber and nitrile rubber. As shown in FIG. 11, the vibration-proof rubber 210 has a rotator shape having a given central axis as a center, and has a hole part 210*a* through the central axis part. The vibration-proof rubber 210 has an outer peripheral groove 210*b* in the middle part in the axial direction. In FIG. 11, the portion partially showing the cross-section of the part which is enclosed by a single dotted line and which is supported by the vibration-proof rubber 210 is extracted and enlarged.

The vibration-proof rubber 210 is interposed between the support face part 151 and the upper horizontal face part 201 of the support plate 200. The vibration-proof rubber 210, in a state where the inner peripheral edge part of the circular through hole part 201*a* formed in the upper horizontal face part 201 fits to the outer peripheral groove 210*b*, is mounted to the upper horizontal face part 201 in a through state. The vibration-proof rubber 210 causes a part above the outer peripheral groove 210*b* to protrude above the upper face of the upper horizontal face part 201, and causes a part below the outer peripheral groove 210*b* to protrude below the lower face of the upper horizontal face part 201.

A grommet 211 is interposed between the vibration-proof rubber 210 and the support face part 151. The grommet 211 has a cylindrical part and a brim part formed on the lower end side of the cylindrical part. The cylindrical part is inserted into the hole part 210*a* of the vibration-proof rubber 210, and the brim part is sandwiched between the lower face of the vibration-proof rubber 210 and the support face 151*a* of the support face part 151. That is, the vibration-proof rubber 210's part lower than the outer peripheral groove 210*b* is sandwiched between the lower face of the upper horizontal face part 201 and the upper face of the brim part of the grommet 211.

A mount bolt 212 is inserted from the upper side into the grommet 211's cylindrical part which is inserted into the hole part 210*a* of the vibration-proof rubber 210. The mount bolt 212 penetrates a hole part 151*e* formed in the vibration-proof rubber 210, the grommet 211, and the support face part 151, and is screwed into a nut part 213 provided on the lower face 151*b* of the support face part 151. A washer 214 is interposed between a head part of the mount bolt 212 and the vibration-proof rubber 210. Thus, the part which is of the support plate 200 and which is supported to the support face part 151 by the vibration-proof rubber 210 is fastened and supported to the support face part 151 by the mount bolt 212.

The power feeder 46 is fixed and supported to the front and back support plates 200 which are elastically supported to the support face part 151. The front support plate 200A covers most of the front end face 151*c* of the support face part 151 from the front side, and the lower horizontal face part 203 is positioned on the front side below the support face part 151. Further, the back support plate 200B covers most of the back end face 151*d* of the support face part 151 from the back side, and the lower horizontal face part 203 is positioned on the back side below the support face part 151.

In the power feeder 46; by a fixing bolt 215, the lower horizontal face part 203 of the support plate 200 is fastened and fixed from the upper side to the part that extends front and back from the support face part 151 in plan view. In the casing of the power feeder 46, the front and back end parts is provided with a boss part 46*a*, which is formed with a threaded hole opening to the upper side, as a part into which the fixing bolt 215 is screwed.

The parts fixed by the fixing bolts 215 are provided in three places near both end parts and in the middle part of the lower horizontal face part 203 in the longitudinal direction. A cylindrical spacer 216 is interposed between the lower horizontal face part 203 and an open end face of the boss part 46*a*. The fixing bolt 215 is screwed into the boss part 46*a* from the upper side through the lower horizontal face part 203 and the spacer 216.

As described above, by the vibration-proof support part 220 using the vibration-proof rubbers 210, the power feeder 46 is supported in a vibration-proof manner via the front and back support plates 200 to the support face part 151, in a total of four places, two on the front side and two on the back side, and the power feeder 46, in the above state, is positioned below the support face part 151 of the tank support base 150. Most of the right side face part of the power feeder 46 is covered with the outside face part 152 of the tank support base 150, and most of the left side face part of the power feeder 46 is covered with the inside face part 154 of the tank support base 150.

The power feeder 46, which is supported in a vibration-proof manner at four points as described above, is provided in a position spaced apart from the lower face 151*b* of the support face part 151 of the tank support base 150. The power feeder 46, which has a substantially rectangular thick plate-shaped outline, has a flat upper face part 46*b*, and is supported below the support face part 151 in a posture parallel to the support face part 151. Then, the power feeder 46 is so provided as to form a gap between the power feeder 46 and the support face part 151.

That is, the gap 225 having a dimension S2 is present between the upper face part 46*b* of the power feeder 46 and the lower face 151*b* of the support face part 151 (see FIG. 11). The gap 225 is a space part between the lower face 151*b* of the support face part 151 and the upper face part 46*b* of the power feeder 46 which are each a horizontal face and which are opposite each other in the up/down direction.

Thus, the power feeder 46 is supported in a position via the gap 225 between the power feeder 46 and the support face part 151 of the tank support base 150. The size of the dimension S2 of the gap 225 is adjusted, for example, by the vertical dimension of the longitudinal face part 202 of the support plate 200.

Further, in the space part 159 below the tank support base 150, there is provided the converter 230 below the power feeder 46. That is, the excavator 1 includes the converter 230 as a third electric device placed below the power feeder 46 as the second electric device.

The converter 230 is a DC/DC converter, which controls the voltage of DC power and converts DC power into DC power, and has a function for performing conversion, stabilization, etc. of the voltage. The converter 230 exchanges a signal with the control units of the power feeder 46 and inverter device 48 thereby to indirectly control the power sent to the electric motor 12.

In the present embodiment, the converter 230 receives DC power supplied from the power feeder 46 or from the battery unit 47, and steps down the voltage of these DC powers thereby to generate a low voltage. The DC power converted by the converter 230 is input to the inverter device 48, and the AC power controlled by the inverter device 48 is supplied to the electric motor 12. Further, the converter 230 may have the function of supplying power from the power feeder 46 to a low-voltage battery for supplying power to the integrated control unit provided for the excavator 1.

The placement configuration and mount structure of the converter 230 is to be described using FIGS. 11 to 14. The converter 230, below the power feeder 46, is placed on the base plate part 80.

The converter 230 has a substantially cuboid outline, and is placed with its longitudinal direction facing front and back. The outline of the converter 230 is smaller in plan view than the power feeder 46, and the entirety of the converter 230 is provided in a position covered from above by the power feeder 46. Regarding the right side face part of the converter 230; substantially entirety thereof is covered with the outside face part 152 of the tank support base 150, and regarding the left side face part of the converter 230, the front upper part is covered with the inside face part 154 of the tank support base 150 (see FIG. 13).

The converter 230 is supported via a support base plate 240 on the base plate part 80. The support base plate 240 is supported in a vibration-proof manner to the base plate part 80, and the converter 230 is supported in a vibration-proof manner via the support base plate 240 to the base plate part 80.

The support base plate 240 includes a plate-shaped member so formed as to be bent into a given shape, forming a platform-shape part on the base plate part 80. The support base plate 240 is based on a horizontal device-mount face part 241 that receives the mounting of the converter 230, and has a longitudinal face part 242 and a lower support face part 243 that together with the device-mount face part 241 form a substantially crank-shaped cross-sectional shape on both front and back sides of the device-mount face part 241.

The device-mount face part 241 is a rectangular plate-shaped part having substantially the same size as the outline dimension of the converter 230, according to the substantially rectangular outline dimension of the converter 230 in plan view. To the device-mount face part 241, the converter 230, in a state of covering substantially entirety of an upper face 241a of the device-mount face part 241, is fixed at the four corners by fixing bolts 245. The fixing bolt 245 passes through flange parts 230a formed at the four corners of the casing of the converter 230 and through the device-mount face part 241, and is screwed into a nut part 246 provided on the lower face 241b of the device-mount face part 241.

The lower support face part 243 is a horizontal face part parallel to the device-mount face part 241, and the front or back edge part of the device-mount face part 241 is connected to the back or front edge part of the lower support face part 243 by the vertical longitudinal face part 242. The support base plate 240 is so configured as to be substantially symmetrical in the front and back, and has a flattened substantially hat shape in lateral view (see FIG. 13).

The support base plate 240, in a state where the front and back lower support face parts 243 overlap the base plate part 80 from above, is supported by the vibration-proof rubber 210 in a vibration-proof manner to the base plate part 80. For each of the front and back lower support face parts 243, the part supported by the vibration-proof rubber 210 is provided at two places near both end parts of the lower support face part 243 in the longitudinal direction.

In the support part of the support base plate 240, the vibration-proof rubber 210 is interposed between the lower support face part 243 and the base plate part 80. The vibration-proof rubber 210, in a state where the inner peripheral edge part of the circular through-hole part formed in the lower support face part 243 fits to the outer peripheral groove 210b, is mounted to the lower support face part 243. The vibration-proof rubber 210 causes a part above the outer peripheral groove 210b to protrude above the upper face of the lower support face part 243, and causes a part below the outer peripheral groove 210b to protrude below the lower face of the lower support face part 243.

The grommet 211, a cylindrical part of which is inserted into the hole part 210a of the vibration-proof rubber 210, is interposed between the vibration-proof rubber 210 and the base plate part 80. The grommet 211 has its brim part sandwiched between the lower face of the vibration-proof rubber 210 and the upper face 80a of the base plate part 80. That is, the vibration-proof rubber 210's part below the peripheral groove 210b is sandwiched between the lower face of the lower support face part 243 and the upper face of the brim part of the grommet 211.

A mount bolt 247 is inserted from the upper side into the cylindrical part of the grommet 211 which is inserted into the hole part 210a of the vibration-proof rubber 210. The mount bolt 247 passes through the vibration-proof rubber 210 and the grommet 211, and is screwed into the base plate part 80, etc. A washer 248 is interposed between the head part of the mount bolt 247 and the vibration-proof rubber 210. Thus, the part which is of the support base plate 240 and which is supported to the base plate part 80 by the vibration-proof rubber 210 is fastened and supported to the base plate part 80 by the mount bolt 247.

As described above, by the vibration-proof support part 250 using the vibration-proof rubber 210, the converter 230 is supported in a vibration-proof manner via the support base plate 240 to the base plate part 80, in a total of four places, two on the front side and two on the back side. In the above support state, the converter 230 is positioned below the support face part 151 of the tank support base 150 and on the base plate part 80.

The converter 230, which is supported in a vibration-free manner at four points as described above, is provided in a position spaced apart from the upper face 80a of the base plate part 80. In the present embodiment, the converter 230 has the support base plate 240 interposed between the converter 230 and the base plate part 80, and the device-mount face part 241 is spaced apart from the upper face 80a of the base plate part 80.

The device-mount face part 241 is parallel to the upper face 80a of the base plate part 80. Then, the support base plate 240 is provided in a state of forming at a gap between the device-mount face part 241 and the upper face 80a of the base plate part 80. That is, a gap 249 is present between the lower face 241b of the device-mount face part 241 and the upper face 80a of the base plate part 80. The gap 249 is a space part between the lower face 241*b* and the upper face 80*a* which are each a horizontal face and which are opposite each other in the up/down direction.

Thus, the converter 230 has the device-mount face part 241 interposed, via the gap 249, between the converter 230 and the upper face 80*a* of the base plate part 80. The size of the gap 229 is adjusted, for example, by the vertical dimension of the longitudinal face part 242 of the support base plate 240. Further, there is no limitation on the presence or absence of a gap between the device-mount face part 241 and the converter 230.

The excavator 1 according to the present embodiment including the configuration described above, in the configuration provided with the electric device such as the inverter device 48 that controls the electric motor 12, can obtain a high degree of freedom regarding the layout of the electric device, making it possible to efficiently place the electric device in a limited space.

In the present embodiment; to the hydraulic oil tank 30 provided at the swing frame 7, the inverter device 48 is provided in the position spaced apart from the left side face part 30*a*. The above configuration can place the inverter device 48 in a narrow space in the exterior cover part in the upper swing body 20B, thus making it possible to use the vacant space in the exterior cover part as a space for placing another device. This can improve the degree of freedom of design. That is, the space in the exterior cover part can be effectively used, and the degree of freedom in the layout of the device placed in the exterior cover part can be improved, thus making it possible to accomplish an optimal design which accords to the type of construction machine, etc.

The inverter device 48 is provided in the position forming the gap 196, relative to the hydraulic oil tank 30, between the inverter device 48 and the left side face part 30*a*. This configuration can suppress the heat of the hydraulic oil in the hydraulic oil tank 30 from affecting the inverter device 48, making it possible to effectively use the space near the hydraulic oil tank 30. That is, since the hydraulic oil in the hydraulic oil tank 30 is hotter than the outside air, it is inherently difficult to place a precision electric device around the hydraulic oil tank 30 which is a source of heat; but the gap 196 as an air layer serves as an insulation layer, making it possible to suppress heat from being directly transferred from the hydraulic oil tank 30 to the inverter device 48.

Conversely, the gap 196 being present can block the heat of the inverter device 48, which heats up during operation, from affecting the hydraulic oil in the hydraulic oil tank 30, making it possible to keep a good hydraulic oil temperature. Thus, providing the gap 196 can suppress the heat transfer between the hydraulic oil tank 30 and the inverter device 48. In particular, in the present embodiment, the support plate part 171 of the mount support frame 170 is interposed between the hydraulic oil tank 30 and the inverter device 48, making it possible to effectively suppress heat transfer between the hydraulic oil tank 30 and the inverter device 48.

Employing the inverter device 48 as the electric device to be placed on the side of the hydraulic oil tank 30 places the inverter device 48, which has a relatively flat outline, in the longitudinal direction, thereby making it possible to effectively use the space on the side of the hydraulic oil tank 30.

Further, the inverter device 48 is provided in a state of being supported to the tank support base 150. According to this configuration, the inverter device 48 can be indirectly supported to the base plate part 80 using the existing configuration, so the vibration of the swing frame 7 can be suppressed from directly affecting the inverter device 48, making it possible to safely place the inverter device 48. In particular, the inverter device 48 is supported via the mount support frame 170 by the vibration-proof support parts 190 in four places, making it possible to effectively suppress the machine body's vibration from affecting the inverter device 48.

Further, the inverter device 48 is placed between the open part 198 formed at the front end of the upper swing body 20B, which is positioned in front of and below the hydraulic oil tank 30 in the exterior cover part, and the electric fan 62. According to this configuration, operation of the electric fan 62 can take outside air into the exterior cover part, such as the housing space 197 of the hydraulic oil tank 30 and the space inside the drive seat support base 14, thus making it possible to properly keep the ambient temperature in the exterior cover part.

Specifically, as shown in FIG. 10, the suction action of the electric fan 62 takes the outside air through the open part 198 into the exterior cover part (see arrow A1). The air taken into the exterior cover part passes above the tank support base 150 thereby to form a flow toward the back, passes through the radiator 61, and is discharged out of the exterior cover part. Further, the outside air is taken into the exterior cover part also through the open part 80*b* formed in the base plate part 80.

The air thus taken in through the open part 198, etc. passes through the gap 196, etc., between the hydraulic oil tank 30 and the inverter device 48, thereby forming a smooth flow without staying around the inverter device 48. This can prevent the temperature of the interior space of the outer cover part from excessively increasing, making it possible to keep a good operation state of the electric device.

Further, the case of a configuration in which the electric fan 62 is provided outside (right side) of the radiator 61 forms the air flow opposite in the present embodiment. That is, the outside air, by the electric fan 62, is taken from the back part of the machine body into the space in the exterior cover part, and is discharged through the open part 198 at the front side of the machine body. This configuration can also prevent an excessive increase in the temperature of the interior space of the exterior cover part, making it possible to properly keep the interior ambient temperature.

Further, in the present embodiment, the hydraulic oil tank 30 is placed in front of the electric fan 62 placed on the right edge part of the upper swing body 20B, the electric motor 12 is placed in the back part of the upper swing body 20B, and the inside cover 199 for covering the inverter device 48 is provided between the floor part 8 and the right cover part 31. According to this configuration, an air flow path can be easily formed without being blocked by other device around the inverter device 48, even in a configuration where the interior space of the exterior cover part is narrow and it is difficult to form an efficient air flow path, such as a relatively small backward small-swing excavator like the excavator 1. This makes it possible to properly keep the ambient temperature of the interior space of the exterior cover part.

Further, the excavator 1 has a space behind (below) the support face part 151 of the tank support base 150 as a first placement part for the electric device, and includes the power feeder 46 as the electric device provided in the first placement part. According to this configuration, the space in the exterior cover part can be effectively used, and the degree of freedom of layout of the device placed in the exterior cover part can be improved, making it possible to perform an optimal design that accords to the type of the construction machine, etc.

Further, the excavator 1, in the space part 159 below the tank support base 150, has, as a second placement part, a part for placing the converter 230 below the first placement part. This configuration makes it possible to more effectively use the space in the exterior cover part, making it possible to improve the degree of freedom of the layout of the other device.

Further, the power feeder 46 is provided in the position forming the gap 225 relative to the support face part 151 on which the hydraulic oil tank 30 is placed. This configuration can prevent heat of the hydraulic oil in the hydraulic oil tank 30 from affecting the power feeder 46. That is, the gap 225 as an air layer serves as an insulation layer, making it possible to prevent the heat from the hydraulic oil tank 30 from being transferred to the power feeder 46.

Conversely, the gap 225 being present can block the heat of the power feeder 46, which heats up during operation, from affecting the hydraulic oil in the hydraulic oil tank 30, making it possible to keep a good hydraulic oil temperature. Thus, providing the gap 225 can reduce heat transfer between the hydraulic oil tank 30 and the power feeder 46. Further, the gap 225 and the space part 159 which is below the tank support base 150 serve as a path for air taken in through the open part 198, thus making it possible to prevent the heat from staying around the power feeder 46.

Further, the converter 230 is placed below the power feeder 46, and thus is positioned more spaced apart from the hydraulic oil tank 30 than the power feeder 46, making it possible to suppress the heat effect on the hydraulic oil tank 30. Further, the gap 249 below the converter 230 and the space part 159 below the tank support base 150 serve as a path for air taken in through the open part 198, thus making it possible to suppress the heat from staying around the converter 230.

Further, to the tank support base 150, the power feeder 46 is supported in a vibration-free manner by the vibration-proof support parts 220 in four places. This configuration makes it possible to suppress the vibration of the swing frame 7 from directly affecting the inverter device 48, making it possible to safely place the power feeder 46. Further, to the base plate part 80, the converter 230 is supported by the vibration-proof support parts 250 in four places. This can suppress the vibration of the swing frame 7 from affecting the converter 230.

According to the layout configuration of the inverter device 48, the power feeder 46, and the converter 230 according to the present embodiment; in relation to an engine machine including, as the drive source, an engine instead of the electric motor 12, for example, the configuration of the upper swing body of the existing engine machine can be used as is or with some modifications, without changing the frame structure of the swing frame 7 or the layout of other device in the swing frame 7, etc. That is, the basic configuration of the upper swing body can be shared between the electric configuration, which includes the electric motor 12, and the engine machine. This makes it possible to reduce cost.

The hydraulic oil tank 30 included in the excavator 1 according to the present embodiment and the drain structure of the hydraulic oil tank 30 will be described using FIGS. 6 and 15 to 17.

The construction machine such as the excavator 1, for example, includes a hydraulic oil tank to tank the hydraulic oil supplied to the hydraulic actuator such as a hydraulic cylinder included in the excavation device. The hydraulic oil in the hydraulic oil tank is supplied via the hydraulic pump, a control valve and the like to the hydraulic actuator.

U.S. Pat. No. 3,952,994, for example, discloses a configuration in which, in an upper swing body of a construction machine, a drain pipe is so provided as to be branched off from a return piping by a hose or the like placed in a site below a hydraulic oil tank, and an opening/closing means is provided at the outlet of the drain pipe, wherein opening the outlet of the drain pipe by opening/closing means can drain, through the return piping, the oil in the hydraulic oil tank. According to this configuration, the hydraulic oil in the hydraulic oil tank can be guided through the return piping to the outlet of the drain pipe, and can be drained through the drain pipe.

However, the above configuration has such a problem that the return piping and the drain pipe are placed on the center side of the upper swing body as the machine body, thus making the piping configuration complex and complicating the drain work (waste oil work).

Then, the excavator 1 according to the present embodiment, regarding the drain structure of the hydraulic oil tank 30, provides a configuration that simplifies the piping configuration, making it possible to improve the workability of the drain work.

Figure 16:
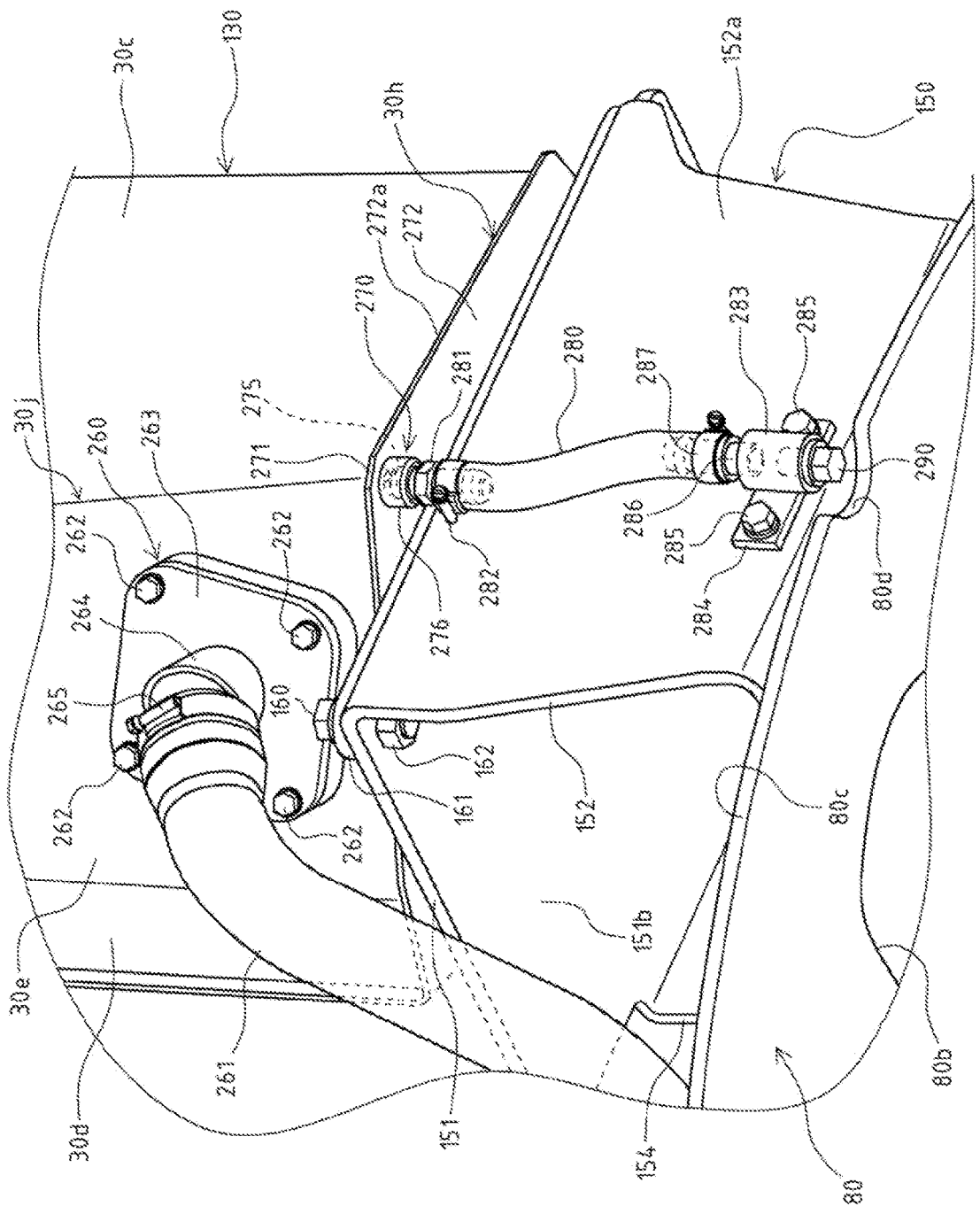
FIG. 16 is a perspective view from the bottom side showing the hydraulic oil tank and the drain structure according to the one embodiment of the present invention.

As shown in FIGS. 15 and 16, in the hydraulic oil tank 30, a suction pipe 261 is connected via a suction flange 260 to the lower part of a right back inclined face part 30e. The suction flange 260 has a substantially rectangular flange portion 263 with four corners fixed to the tank body part 130 by bolts 262, and a connection pipe part 264 protruding from the flange portion 263. One end side of the suction pipe 261 is communicatively connected to the connection pipe part 264.

The one end side of the suction pipe 261, in a state where the connection pipe part 264 is inserted thereinto, is fixed to the connection pipe part 264 by a hose belt 265. The suction pipe 261 extends from the suction flange 260 backward and downward to the left, and also extends out toward the back edge part of the base plate part 80 toward the method, and is connected to the hydraulic pump 41 placed on the left side of the electric motor 12.

As shown in FIGS. 6 and 15, on the base plate part 80 of the swing frame 7, the hydraulic oil tank 30 is placed on the tank support base 150 provided in the edge part on the right front side. The hydraulic oil tank 30 has a drain port 270.

The drain port 270 includes a mount port 275 provided in the bottom face part 30h of the hydraulic oil tank 30, and a connector 276 mounted to the mount port 275. In the bottom face part 30h which is formed by a plate-shaped member and forms the housing space of the hydraulic oil tank 30, the mount port 275 is formed as a circular hole part through the bottom face part 30h. The mount port 275 is a part that causes the housing space of the hydraulic oil tank 30 to open facing down.

The connector 276 includes a cylindrical metal member formed with a through hole by the inner peripheral face, and is fixed to a lower face 30k of the bottom face part 30h by welding or the like. In the connector 276, a through hole that serves as a flow path of the hydraulic oil is so provided as to communicate to the mount port 275. The inner diameter of the flow path of the connector 276 is substantially the same as the hole diameter of the mount port 275, and the outer diameter of the connector 276 is larger than the hole diameter of the mount port 275.

The drain port 270 is placed in the outer peripheral edge part of the hydraulic oil tank 30, and protrudes below the bottom face part 30h. The bottom face part 30h, in plan view, has a substantially pentagonal shape with side parts along each of the left side face part 30a, front face part 30b, right front inclined face part 30c, right back inclined face part 30e, and back face part 30d of the tank body part 130 (see FIGS. 8 and 15). Further, the bottom face part 30h causes the edge part, which corresponds to each of the front face part 30b, the right front inclined face part 30c, the right back inclined face part 30e, and the back face part 30d, to slightly protrude in a form of a brim.

In the bottom face part 30h of the hydraulic oil tank 30, the drain port 270 is placed below a part near an edge part 271 formed by the side part which corresponds to the right front inclined face part 30c and the side part which corresponds to the right back inclined face part 30e. That is, the drain port 270 is positioned below the lower end part of a ridge part 30j formed by the right front inclined face part 30c and the right back inclined face part 30e.

The hydraulic oil tank 30 causes the edge part on right side of the bottom face part 30h to be a protruding edge part 272 that protrudes, as a shape of an eaves, from the support face part 151 of the tank support base 150 to the outside face part 152. The protruding edge part 272, as shown in FIG. 15, is the bottom face part 30h's part that extends from an outside face 152a of the outside face part 152 to the outer peripheral side (right side in FIG. 15) of the base plate part 80. In FIG. 15, the dimension of the bottom face part 30h's part that extends from the outside face 152a of the outside face part 152 is shown by a dimension B1. Further, the tank body part 130's side face part that extends from the outside face 152a of the outside face part 152 includes the lower part of an edge part that forms the ridge part 30j.

Thus, the hydraulic oil tank 30 causes the part which is of the tank body part 130 and which is in the outer peripheral site of the base plate part 80 to protrude from the outer peripheral edge part of the tank support base 150. The protruding edge part 272, which is the outer peripheral edge part of the hydraulic oil tank 30 and which is outside the bottom face part 30h, includes the site for placing the drain port 270. That is, the drain port 270 is placed between the outer peripheral edge part of the protruding edge part 272, which edge part is the outer peripheral edge part of the hydraulic oil tank 30, and the outside face part 152, which is the outer peripheral edge part of the tank support base 150.

Further, the hydraulic oil tank 30 causes the right edge part of the bottom face part 30h to protrude outward relative to the outer peripheral edge part of the base plate part 80. As shown in FIGS. 15 and 16, the base plate part 80 causes an outer peripheral face 80c, which forms the outer peripheral edge part thereof, to be positioned on the outer peripheral side (right side in FIG. 15) relative to the outside face part 152 of the tank support base 150.

Then, the protruding edge part 272 of the bottom face part 30h of the tank body part 130 causes an outer peripheral portion thereof to protrude outward from the outer peripheral face 80c of the base plate part 80. In FIG. 15, the dimension of the bottom face part 30h's part that extends outward from the outer peripheral face 80c of the base plate part 80 is shown by a dimension B2. Thus, the hydraulic oil tank 30 causes the part which is of the tank body part 130 and which is the outer peripheral site of the base plate part 80 to protrude from the outer peripheral edge part of the base plate part 80.

The tank body part 130 of the hydraulic oil tank 30 has a trapezoidal shape in front view, as shown in FIG. 6, by the left side face part 30a, the bottom face part 30h, the ridge part 30j, and the back upper face part 30f. The left side face part 30a positioned inside the right and left of the tank body part 130 is a vertical face part, and forms a right angle in front view in combination with the bottom face part 30h. The ridge part 30j of the tank body part 130 is so inclined from the upper side to the lower side as to extend from right/left inside to the outside, forming an acute angle in front view in combination with the bottom face part 30h.

In the tank body part 130 thus forming the trapezoidal shape in front view, as shown in FIG. 6, a width dimension X1 of the back upper face part 30f and a width dimension X2 of the bottom face part 30h in the right/left direction are different from each other, in width in the right/left direction. In the right/left inside (right side in FIG. 6) edge, the back upper face part 30f and the bottom face part 30h have substantially the same in position in the right/left direction as each other. In the right/left outside (left side in FIG. 6) edge of these face parts, the bottom face part 30h is positioned more right/left outside than the back upper face part 30f. As a result, the width dimension X2 of the bottom face part 30h is longer than the width dimension X1 of the back upper face part 30f.

Thus, the tank body part 130 causes the right/left width dimension of the upper end face part formed by the back upper face part 30f and the right/left width dimension of the lower end face part formed by the bottom face part 30h to be different from each other. The tank body part 130, due to the inclination of its right/left outside side face part, has the width dimension of the lower end face part longer than the width dimension of the upper end face part. Then, as shown in FIG. 15, the drain port 270 is provided on the lower side of the part that is of the lower end face part of the tank body part 130 and that protrudes to the right/left outside more than the upper end face part.

Further, in the hydraulic oil tank 30, the upper face of the bottom face part 30h which forms the bottom face of the housing space of the hydraulic oil can be an inclined face that is inclined downward from the right/left inside to the right/left outside. Specifically, as shown in FIG. 15, the housing space's bottom face 278 as the upper face of the bottom face part 30h is an inclined face that gradually descends from the right/left inside to the right/left outside. Here, regarding the inclination of the bottom face 278, the right/left inside is the swing center side of the base plate part 80 along the circular outline, and the right/left outside is the radial outside of the base plate part 80.

In this configuration where the bottom face 278 of the hydraulic oil tank 30 is an inclined face, the bottom face part 30h formed by the plate-shaped member is an inclined face part that is inclined as a whole along the inclination of the bottom face 278. Thus, the bottom face 278 of the hydraulic oil tank 30 can be inclined down toward the outer peripheral edge part of the base plate part 80.

To the drain port 270, the base end part as an end part on one side of the drain hose 280 is communicatively connected. The base end part of the drain hose 280 is connected via an upper pipe joint 281 to the drain port 270.

The upper pipe joint 281 is a linear tubular member, having a nut-shaped part in the middle part. The upper pipe joint 281, in a state where the upper part as one end side is inserted from the lower side into the connector 276 forming the drain port 270, is mounted to the connector 276. The upper pipe joint 281 is fixed to the connector 276 by screw insertion, press fitting or the like. The upper pipe joint 281 has an upper open end face thereof positioned directly below the mount port 275.

The upper pipe joint 281, in a state where the lower part as the other end side is inserted into the base end part of the drain hose 280, is mounted to the drain hose 280. The base end part of the drain hose 280, in a state where the lower part of the upper pipe joint 281 is inserted thereinto, is fixed to the upper pipe joint 281 by a hose belt 282.

The drain hose 280 extends downward from the drain port 270, and is fixed via a drain socket 283 to the outside face part 152 forming the side wall part of tank support base 150. The drain socket 283 includes a cylindrical metal member forming a through hole formed by an inner peripheral face. In a state where the direction of penetration of the through hole that serves as the flow path for the hydraulic oil is defined as the up/down direction, the drain socket 283 is mounted via a fixing plate part 284 to the lower edge part of the outside face part 152, which edge part is the middle part of the outside face part 152 in the width direction. Regarding the front/back direction, the drain socket 283 is provided in a position slightly shifted forward of the drain port 270.

The fixing plate part 284 is provided by fixing, by welding or the like, a rectangular plate-shaped member to a cylindrical member forming the drain socket 283. The fixing plate part 284 is fixed to the outer peripheral face part of the drain socket 283 with the longitudinal direction as the transverse direction, and is fixed to the outside face part 152 with fixing bolts 285 that pass through both end parts in the longitudinal direction. The drain socket 283 which receives the connection of the lower end part of the drain hose 280 is fixed via the fixing plate part 284 to the outside face part 152 of the tank support base 150.

To the drain socket 283, the lower end part as the other end part of the drain hose 280 is communicatively connected. The lower end part of the drain hose 280 is communicatively connected via a lower pipe joint 286 to the drain socket 283.

The lower pipe joint 286 is a linear tubular member, and, in a state where an upper part as one end side is inserted from the lower side into the lower end part of the drain hose 280, is mounted to the drain hose 280. The lower end part of the drain hose 280, in a state where the upper part of the lower pipe joint 286 is inserted thereinto, is fixed to the lower pipe joint 286 by a hose belt 287 or the like.

The lower pipe joint 286, in a state where the lower end part as the other end part is inserted from the upper side into the drain socket 283, is mounted to the drain socket 283. The lower pipe joint 286 is fixed to the drain socket 283 by screw insertion, press fitting or the like. The lower pipe joint 286 has the lower open part opened in the hole part of the drain socket 283.

With the above connection configuration of the drain hose 280, the drain hose 280, from the connector 276 positioned near the upper edge part of the outside face part 152 to the drain socket 283 provided in the position slightly shifted forward relative to the connector 276 and that is provided in the lower part of the outside face part 152, is placed in a substantially up/down direction along the outside face 152a of the outside face part 152.

The drain bolt 290 is mounted to the lower open part of the drain socket 283. The inner peripheral face of the hole part of the drain socket 283 is threaded, and the drain bolt 290 is screwed from the lower side into the hole part in the drain socket 283. The lower open part of the drain socket 283 serves as a drain port for the hydraulic oil. The drain socket 283, in the up/down direction, has a lower open end face thereof positioned near the upper face 80a of the base plate part 80.

In the above drain structure, the drain work is performed by removing the drain bolt 290 from the drain socket 283. The hydraulic oil in the hydraulic oil tank 30 flows, by gravity, from the drain port 270 through the upper pipe joint 281, the drain hose 280, and the lower pipe joint 286 into the hole part in the drain socket 283, and flows out downward through the hole part in the drain socket 283. After the drain work, the drain bolt 290 is screwed into the drain socket 283, closing the lower open part of the drain socket 283.

Figure 17:
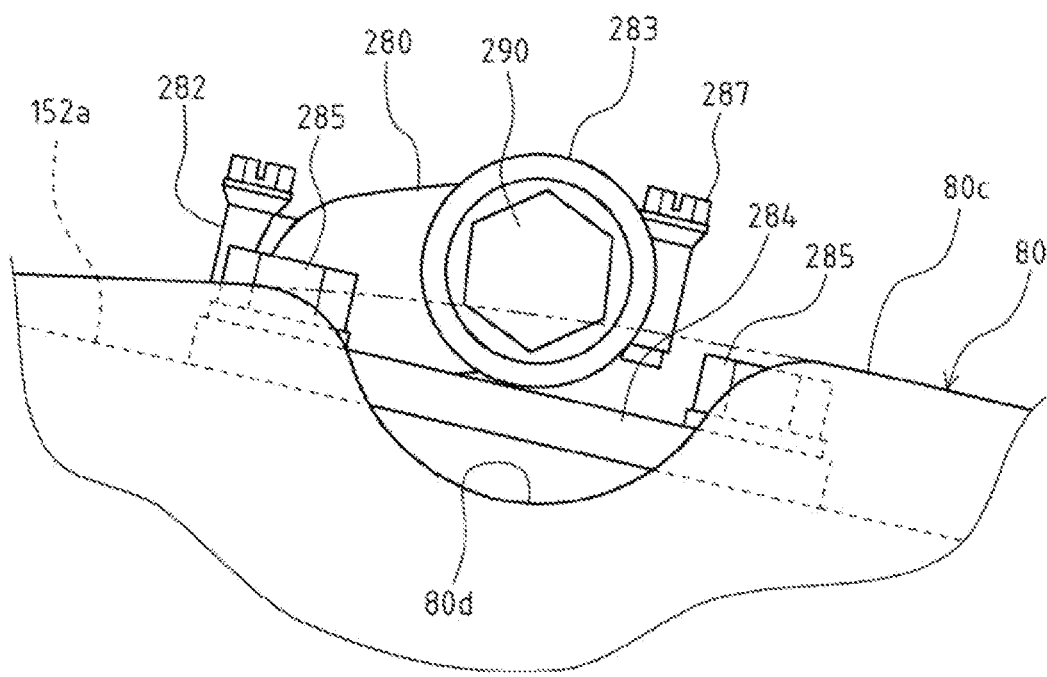
FIG. 17 is a bottom view of the drain structure of the hydraulic oil tank according to the one embodiment of the present invention.

In the outer peripheral edge part of the base plate part 80, a cutout part 80d is formed in the site below the drain socket 283. As shown in FIG. 17, the cutout part 80d is a recess part in the mode of being substantially semi-circularly cut out relative to the circumferential shape along the outer peripheral face 80c of the base plate part 80. Due to the cutout part 80d, the lower end part of the drain bolt 290 is placed below the upper face 80a of the base plate part 80 in the up/down direction.

As shown in FIG. 17, the cutout part 80d, in bottom view, has an arc shape along a substantially concentric circle relative to the drain socket 283 and the drain bolt 290 which each have a circumferential outline. The radius of the arc shape along the cutout part 80d is substantially twice the radius of the circumferential shape along the outline of the drain socket 283. In bottom view, the drain socket 283 is so provided that substantially ⅓ of the inside (bottom side in FIG. 17) is positioned inside the arc shape along the outer peripheral face 80c of the base plate part 80. Further, in FIG. 17, the arc shape along the outer peripheral face 80c of the base plate part 80 is shown in a two-dot chain line.

The drain port 270 which forms a drain structure provided below the outer edge part of the hydraulic oil tank 30, as described above, is covered with the right cover part 31 which forms the right side part of the exterior cover part, as shown in FIGS. 9 and 15. The right cover part 31 has an upper cover part 31a that forms its upper face part and is curved forward and downward, a side cover part 31b that forms the right side face part of the right cover part 31, and a lower edge cover part 31c that is provided below the side cover part 31b and forms the lower edge part of the right cover part 31 (see FIG. 9).

The side cover part 31b has its back edge part facing the right edge part of each of the back cover part 32 and a counter weight 142 (see FIG. 15). The lower edge cover part 31c is a cover part that has a substantially constant length in the up/down direction, and is curved along the arc shape of the base plate part 80.

The drain port 270 is covered with the side cover part 31b of the right cover part 31. Further, most part, excluding the drain hose 280's lower end part positioned below the drain port 270, is covered with the side cover part 31b. Further, the lower end part of the drain hose 280, the drain socket 283, and the drain bolt 290 are covered with the lower edge cover part 31c of the right cover part 31.

The drain structure according to the present embodiment, regarding the drain structure of the hydraulic oil tank 30, can simplify the piping configuration, making it possible to improve the workability of the drain work.

This drain structure according to the present embodiment has the drain port 270 in the outer peripheral edge part of the hydraulic oil tank 30. This configuration can pipe the drain pipe in the outer peripheral part of the swing frame 7, thus making it possible to simplify the piping configuration without the need for placing the drain pipe on the swing center side of the upper swing body 20B.

Further, the drain port 270 includes the mount port 275 formed in the bottom face part 30h of the hydraulic oil tank 30, and a connector 276 mounted to the mount port 275. This configuration can simplify the configuration of the drain port 270.

Further, the hydraulic oil tank 30 is placed on the tank support base 150, and part of the hydraulic oil tank 30 protrudes from the outer edge part of the tank support base 150. According to this configuration, using the hydraulic oil tank 30's part protruding from the tank support base 150 makes it possible to easily provide the drain port 270.

Further, the drain port 270 is provided between the outer peripheral edge part of the hydraulic oil tank 30 and the outer peripheral edge part of the tank support base 150. This configuration makes it possible to effectively use the outer peripheral space of the tank support base 150.

Further, the hydraulic oil tank 30, regarding the tank body part 130, has a shape in which the dimension of the lower face part is larger on the outer peripheral side than the dimension of the upper face part. According to this configuration, providing the drain port 270 on the lower side of the lower face part extending to the outer peripheral side relative to the upper face part of the tank body part 130 makes it possible to effectively use the space below the hydraulic oil tank 30.

Further, the hydraulic oil tank 30 causes the bottom face 278 of the tank body part 130 to be inclined downward from the right/left inside to the right/left outside. According to this configuration, the bottom face 278 of the hydraulic oil tank 30 inclines downward toward the site for placing the drain port 270. This makes it easy to lead, to the drain port 270 side, the hydraulic oil in the hydraulic oil tank 30, making it possible to efficiently perform the drain work.

Further, the drain hose 280 connected to the drain port 270 is provided in a state of being fixed via the drain socket 283 or the like to the outside of the outside face part 152 of the tank support base 150. According to this configuration, using the outer peripheral space of the tank support base 150 makes it possible to place and support the drain hose 280 by the simple structure.

Further, the drain socket 283, which receives the connection of the drain hose 280 and the fitting of the drain bolt 290, is fixed to the outside of the outside face part 152 of the tank support base 150. According to this configuration, the drain socket 283, which serves as the drain port for the hydraulic oil, can be provided on the outer peripheral side of the tank support base 150, making it possible to obtain a good accessibility to the drain socket 283 and to improve the workability of the drain work.

Further, the hydraulic oil tank 30 partially protrudes from the outer peripheral edge part of the base plate part 80 that supports the tank support base 150. According to this configuration, providing the drain port 270 in the hydraulic oil tank 30's part protruding from the base plate part 80 can position, in the outer peripheral edge part of the base plate part 80, the drain-dedicated flow path extended downward from the drain port 270, making it possible to obtain a good accessibility to the drain socket 283.

Further, the base plate part 80, in the outer peripheral edge part, has the cutout part 80d that corresponds to the placement of the drain socket 283. This configuration can prevent the drain socket 283 and drain bolt 290 from interfering with the base plate part 80, thus making it possible to suppress the drain socket 283 from extending to the outer peripheral side, and to save the space. Further, the space for attaching and detaching the drain bolts 290 mounted to the drain socket 283 can be secured, making it possible to easy attach and detach the drain bolt 290.

Further, the drain port 270 is covered with the right cover part 31. According to this configuration, the right cover part 31 can protect the drain port 270 and the drain-dedicated flow path structure such as the drain hose 280 connected to the drain port 270.

The above description of the embodiment is merely one example of the present invention, and the construction machine according to the present invention is not limited to the above embodiment. Accordingly, it is needless to say that, even to those other than the above embodiment, various modifications can be made according to the design and the like within the scope that does not depart from the technical concept of the present invention. Further, the effects described in the present disclosure are merely illustrative and are not limited, and any other effect may also be exerted.

In the embodiment described above, the electric device placed on the side of the hydraulic oil tank 30 (first electric device) is the inverter device 48, the second electric device placed behind the support face part 151 of the tank support base 150 is the power feeder 46, and the third electric device placed below the power feeder 46 is the converter 230; these electric device and their placement positions are, however, not particularly limited.

The placing of the inverter device 48, the power feeder 46, and the converter 230 may be so configured that positions for placing these electric devices are replaced as proper. Thus, any two of the inverter device 48, the power feeder 46, and the converter 230 may be selected as proper for the second and third electric devices to be placed on the lower side of the space part 159 of the tank support base 150. Further, an electric device other than the inverter device 48, the power feeder 46, and the converter 230 may be employed as the first, second, and third electric devices.

In the embodiment described above, the excavator 1 is an electrically-driven construction machine provided with the electric motor 12 as the prime mover, but the construction machine according to the present embodiment may also be an engine machine provided with an engine which is an inner combustion engine as the prime mover.

Further, the placement configuration of the drive part 10 in the upper swing body 20B and the placement configuration of devices such as the electric motor 12, the hydraulic pump 41, the hydraulic oil tank 30, the radiator 61, and the electric fan 62 may be reversed right and left from the configurations of the above embodiment.

DESCRIPTION OF REFERENCE NUMERALS 1 excavator (construction machine)
7 swing frame (frame)
8 floor part
10 drive part
12 electric motor (prime mover)
14 drive seat support base (seat mount)
15 drive seat
20B upper swing body (machine body)
30 hydraulic oil tank
30a left side face part
31 right cover part
34 front lower cover part
41 hydraulic pump
43 actuator
46 power feeder (second electric device)
48 inverter device (electric device)
62 electric fan (fan)
80 base plate part
150 tank support base (pedestal)
151 support face part
152 outside face part
159 space part
196 gap
197 housing space 198 open part
199 inside cover
225 gap
230 converter (third electric device)
270 drain port
280 drain hose
283 drain socket
290 drain bolt

The invention claimed is:

1. A construction machine comprising:
 a hydraulic oil tank that tanks a hydraulic oil, wherein the hydraulic oil tank is placed on one side of a swing frame in a right-left direction;
 a battery unit that supplies power to an electric motor, wherein the battery unit is placed on another side of the swing frame in the right-left direction relative to the hydraulic oil tank;
 a hydraulic pump driven by the electric motor thereby to supply the hydraulic oil in the hydraulic oil tank to an actuator; and
 an electric device provided for the hydraulic oil tank, the electric device being provided in a position spaced apart from a side face of the hydraulic oil tank and wherein the electric device is located in front of the battery unit and to a side of the battery unit facing the hydraulic tank.

2. The construction machine as claimed in claim 1, wherein the electric device is a device that controls the electric power supplied to the electric motor.

3. The construction machine as claimed in claim 1, wherein the electric device is provided in a state of being supported on a pedestal that supports the hydraulic oil tank.

4. The construction machine as claimed in claim 1, comprising:
 a fan for taking air in a housing space of the hydraulic oil tank,
wherein the electric device is provided between the fan and an open part that is formed in a site by an exterior cover part, which forms the housing space and wherein the exterior cover part is in front of and below the hydraulic oil tank, and vents the housing space to outside environment.

5. The construction machine as claimed in claim 4, comprising:
 a drive part having a drive seat placed on a seat mount provided behind a floor part,
 wherein the fan is placed in an edge part on one of right and left sides of a machine body, the hydraulic oil tank is placed in front of the fan, the prime mover is placed in a back part of the machine body, and a cover which covers the electric device is provided between the floor part and a cover part which covers the hydraulic oil tank.

6. A construction machine comprising:
 a prime mover;
 a hydraulic oil tank that tanks a hydraulic oil;
 a hydraulic pump driven by the prime mover thereby to supply the hydraulic oil in the hydraulic oil tank to an actuator;
 an electric device provided for the hydraulic oil tank, the electric device being provided in a position spaced apart from a side face of the hydraulic oil tank, wherein the electric device is provided in a state of being supported on a pedestal that supports the hydraulic oil tank, and wherein the pedestal forms a space part on a back side of a support face part that supports the hydraulic oil tank, and the construction machine comprises a second electric device provided in a state of being supported on the back side of the support face part.

7. The construction machine as claimed in claim 6, wherein the second electric device is provided in a position spaced apart from a back face of the support face part.

8. The construction machine as claimed in claim 6, comprising:
 a third electric device placed below the second electric device.

* * * * *